United States Patent
Toyama

(10) Patent No.: US 9,146,693 B2
(45) Date of Patent: Sep. 29, 2015

(54) STORAGE CONTROL DEVICE, STORAGE SYSTEM, AND STORAGE CONTROL METHOD

(71) Applicant: PANASONIC CORPORATION, Osaka (JP)

(72) Inventor: Masayuki Toyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 70 days.

(21) Appl. No.: 14/176,911

(22) Filed: Feb. 10, 2014

(65) Prior Publication Data

US 2014/0229688 A1 Aug. 14, 2014

(30) Foreign Application Priority Data

Feb. 14, 2013 (JP) ................. 2013-026297
Feb. 4, 2014 (JP) ................. 2014-019834

(51) Int. Cl.
G06F 3/06 (2006.01)

(52) U.S. Cl.
CPC ............ G06F 3/0665 (2013.01); G06F 3/0619 (2013.01); G06F 3/0683 (2013.01)

(58) Field of Classification Search
CPC .... G06F 3/0619; G06F 3/0665; G06F 3/0683
See application file for complete search history.

(56) References Cited

U.S. PATENT DOCUMENTS

| | | | |
|---|---|---|---|
| 7,899,971 B2 | 3/2011 | Mori et al. | |
| 8,151,047 B2 | 4/2012 | Nakagawa et al. | |
| 8,185,705 B2 | 5/2012 | Maeda et al. | |
| 8,335,893 B2 | 12/2012 | Tagawa | |
| 8,452,923 B2 | 5/2013 | Nakagawa et al. | |
| 9,026,765 B1* | 5/2015 | Marshak et al. | 711/170 |
| 2007/0033364 A1 | 2/2007 | Maeda et al. | |
| 2008/0235467 A1 | 9/2008 | Tagawa | |
| 2009/0031320 A1 | 1/2009 | Nakagawa et al. | |
| 2009/0187730 A1 | 7/2009 | Mori et al. | |
| 2012/0185645 A1 | 7/2012 | Nakagawa et al. | |
| 2014/0075111 A1* | 3/2014 | Pike | 711/114 |

FOREIGN PATENT DOCUMENTS

| | | |
|---|---|---|
| JP | 2005-004514 A | 1/2005 |
| JP | 2007-272721 A | 10/2007 |
| JP | 2008-242503 A | 10/2008 |
| JP | 2008-243156 A | 10/2008 |
| JP | 2009-032014 A | 2/2009 |
| JP | 2009-175824 A | 8/2009 |
| WO | 2005-043394 A1 | 5/2005 |

* cited by examiner

Primary Examiner — Eric Oberly
(74) Attorney, Agent, or Firm — McDermott Will & Emery LLP

(57) ABSTRACT

A storage control device including an area control unit, an attribute control unit, and an access control unit. The area control unit determines one or more valid areas for each type of areas included in respective storage areas stored in two or more storage devices to generate a virtual storage having the valid areas as a storage area. The attribute control unit selects, as speed information of the virtual storage, a lowest value of minimum guaranteed speeds in reading and writing which are included among respective pieces of attribute information stored in the two or more storage devices, with reference to the respective pieces of the attribute information. The access control unit transmits information regarding the storage area of the virtual storage and the speed information to a host device that reads and writes data from/to the virtual storage.

13 Claims, 18 Drawing Sheets

| Area | Logical address instructed by host device | Storage device | Logical address of storage device |
|---|---|---|---|
| Normal area | 0 x 0 to 0 x (AF - 1) | 4A | 0 x 0 to 0 x (AF - 1) |
| | 0 x AF to 0 x (FS - 1) | 4B | 0 x 0 to 0 x (FS - AF - 1) |
| | 0 x FS to 0 x (FS + AA - 1) | 4A | 0 x AF to 0 x (AA - 1) |
| | 0 x (FS + AA) to 0 x (FU - 1) | 4B | 0 x BF to 0 x (FU - FS - AA + 1) |
| Protected area | 0 x 0 to 0 x (PU - 1) | 4B | 0 x 0 to 0 x (BS - 1) |

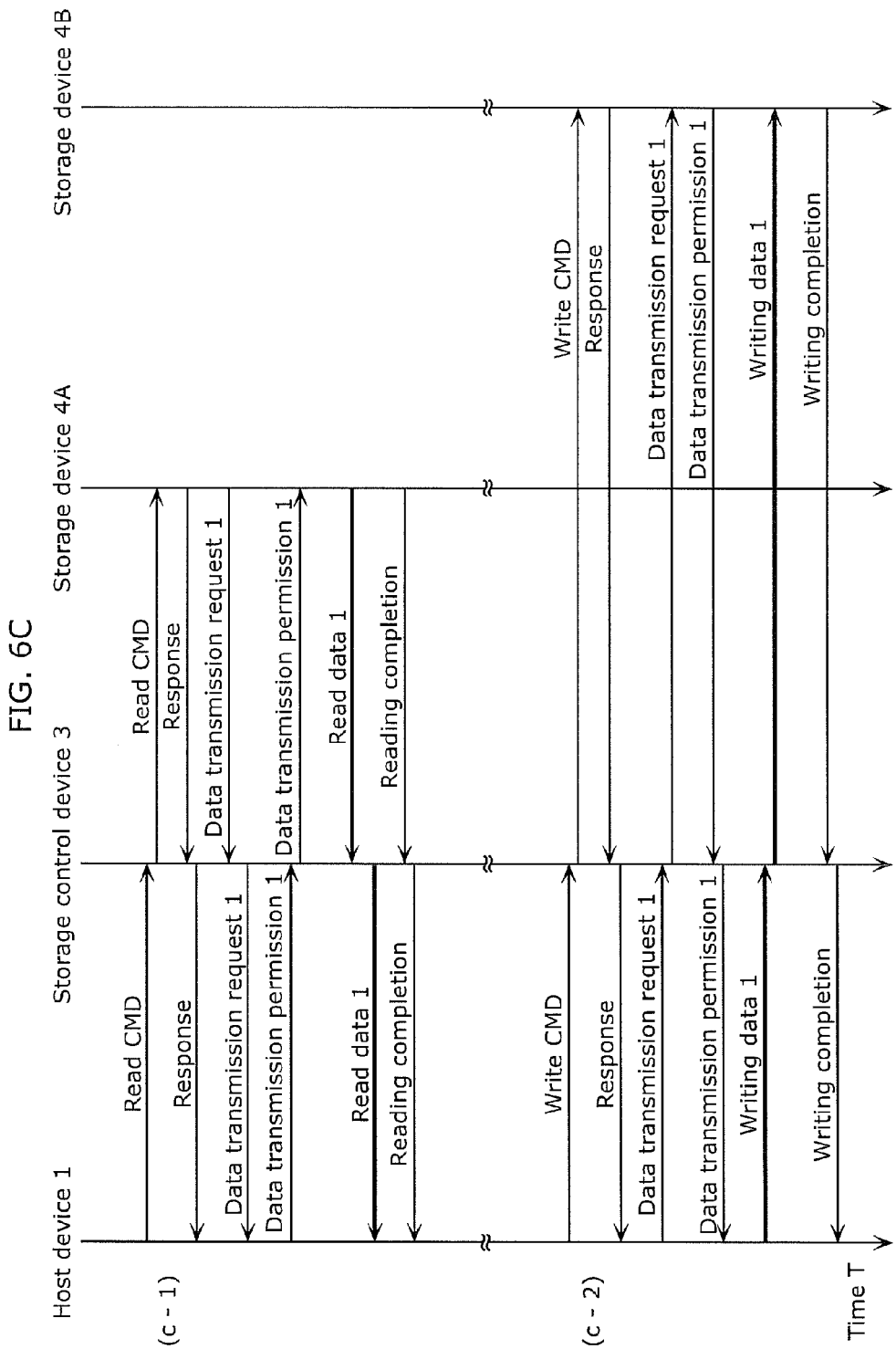

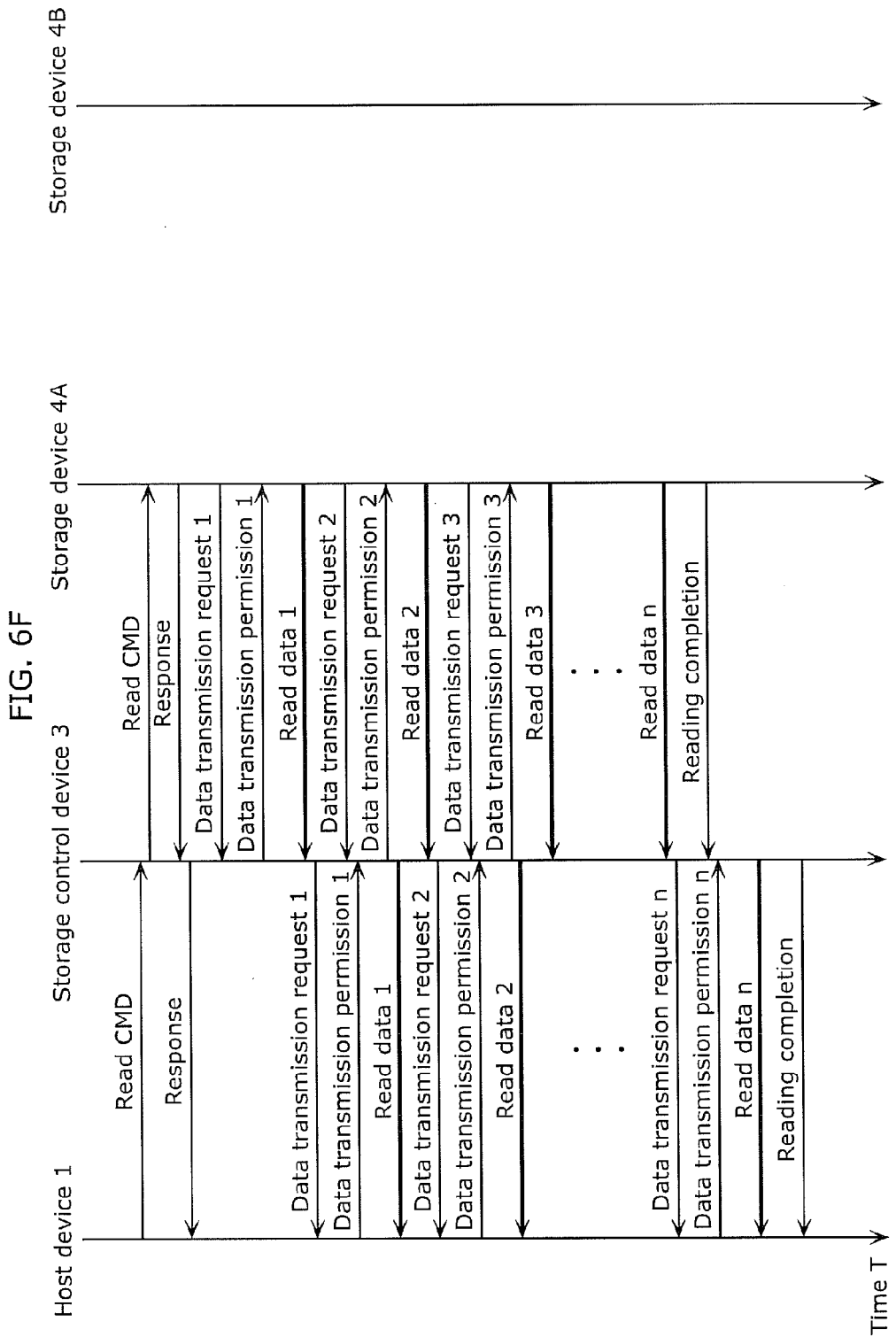

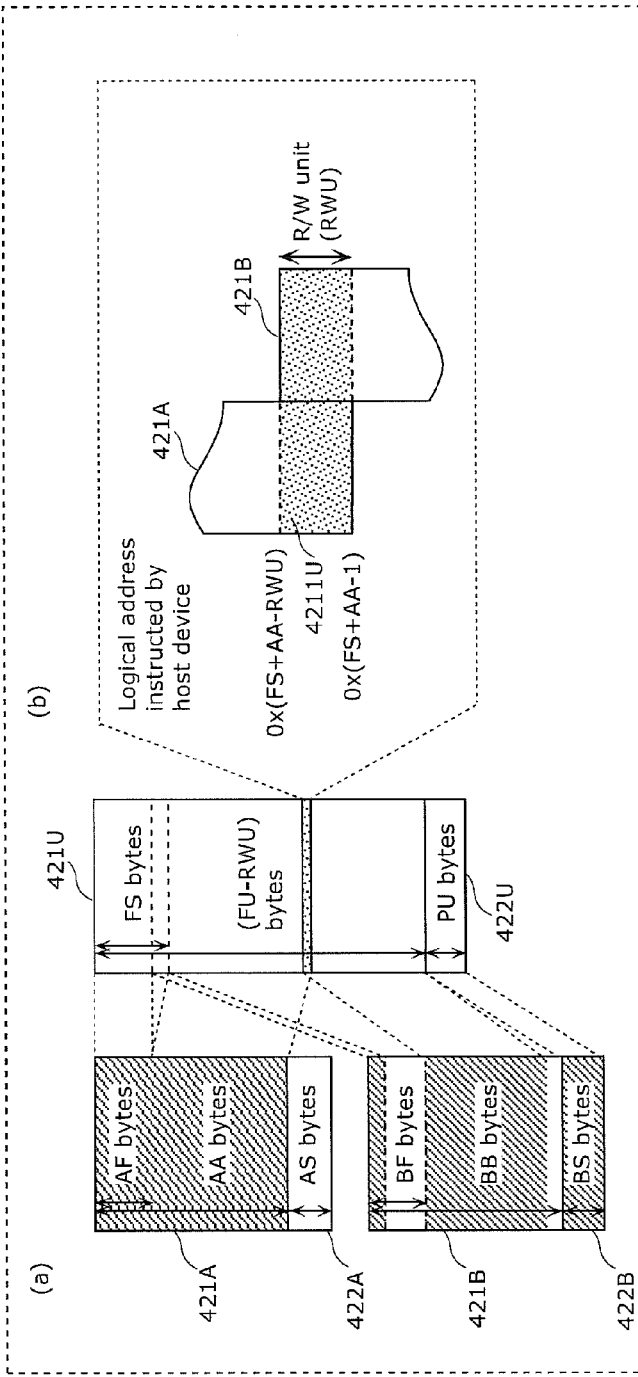

FIG. 8A
| Offset block address | Data status |
|---|---|
| 0 x 0 | empty |
| 0 x 1 | empty |
| 0 x 2 | empty |
| ... | ... |
| 0 x (RWU - 1) | empty |
FIG. 8B
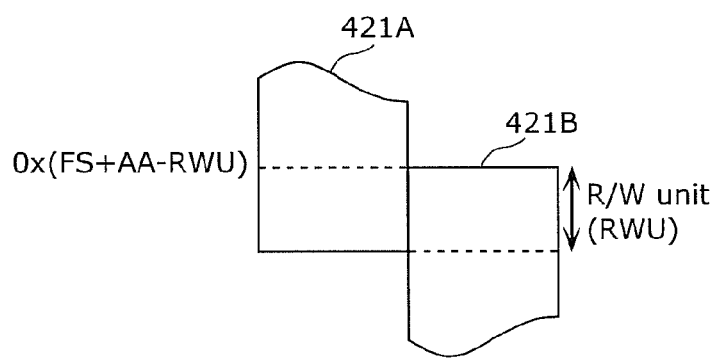
FIG. 8C
| Offset block address | Data status |
|---|---|
| 0 x 0 | Valid |
| 0 x 1 | Valid |
| 0 x 2 | Valid |
| ... | ... |
| 0 x (Z - 1) | Valid |
| 0 x Z | empty |
| ... | ... |
| 0 x (RWU - 1) | empty |
FIG. 8D
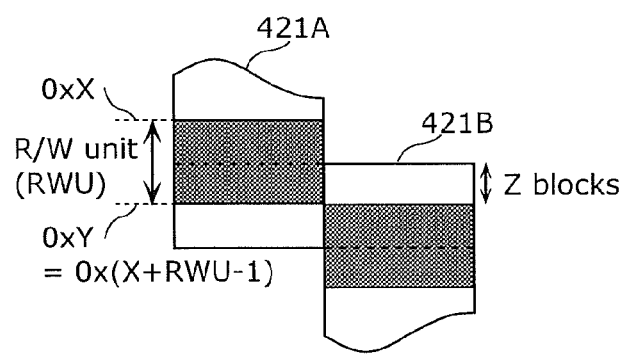

STORAGE CONTROL DEVICE, STORAGE SYSTEM, AND STORAGE CONTROL METHOD

CROSS REFERENCE TO RELATED APPLICATIONS

The present application is based on and claims priority of Japanese Patent Application No. 2013-026297 filed on Feb. 14, 2013 and Japanese Patent Application No. 2014-019834 filed on Feb. 4, 2014. The entire disclosures of the above-identified applications, including the specifications, drawings and claims are incorporated herein by reference in their entirety.

FIELD

The present disclosure relates to storage control devices, storage systems, and the like, which combine a plurality of storage devices into a large-capacity virtual storage.

BACKGROUND

Japanese Unexamined Patent Application Publication No. 2009-175824 (Patent Literature 1 (PLT 1)) discloses a main frame storage control device connected to a main frame and to other storage control device(s). The main frame storage control device converts commands and data received from the main frame into commands and data to be transmitted to the other storage control device(s). In addition, the main frame storage control device transmits data received from the other storage control device(s) to a host computer. It is thereby possible to provide the main frame with a plurality of real volumes as a single virtual volume.

CITATION LIST

Patent Literature

[PTL 1] Japanese Unexamined Patent Application Publication No. 2009-175824

SUMMARY

Technical Problem

The present disclosure provides a storage control device, a storage system, and the like, which combines a plurality of storage devices into a large-capacity virtual storage that is accessible in real time.

Solution to Problem

The storage control device according to the present disclosure controls two or more storage devices, including: an area control unit configured to determine one or more valid areas for each type of areas included in respective storage areas stored in the two or more storage devices to generate a virtual storage having, as a storage area, a set of the one or more valid areas; an attribute control unit configured to select, as speed information of the virtual storage, a lowest value of minimum guaranteed speeds in reading and writing which are included among respective pieces of attribute information stored in the two or more storage devices, with reference to the respective pieces of the attribute information; and an access control unit configured to transmit information regarding the storage area of the virtual storage and the speed information to a host device that reads and writes data from/to the virtual storage.

Advantageous Effects

The storage control device and the storage system according to the present disclosure a virtual storage created from a plurality of storage devices so as to be easily controlled by a host device, have a large capacity, and be accessible in real time.

BRIEF DESCRIPTION OF DRAWINGS

These and other objects, advantages and features of the present disclosure will become apparent from the following description thereof taken in conjunction with the accompanying drawings that illustrate a specific embodiment.

FIG. 6C is a sequence diagram of a communication flow between the host device and the storage system in the case where an access of the host device is recognized as a memory access to only one of the storage devices, according to Embodiment 1.

FIG. 6F is a sequence diagram of a communication flow in the case where data exchange between the host device and the storage control device and data exchange between the storage control device and the storage device are controlled in parallel.

FIG. 7A is a schematic diagram showing how a storage control device generates a storage area of a virtual storage according to Embodiment 2.

FIG. 7B is an example of an address conversion table stored in the storage control device according to Embodiment 2.

FIG. 8A is an example of an overlapping area management table used by the storage control device to manage an overlapping area, according to Embodiment 2.

FIG. 8B is a schematic diagram showing an example of an overlapping area according to Embodiment 2.

FIG. 8C is an example of the overlapping area management table used by the storage control device to manage an overlapping area, according to Embodiment 2.

FIG. 8D is a schematic diagram showing an example of an overlapping area according to Embodiment 2.

DESCRIPTION OF EMBODIMENTS

Figure 2A:
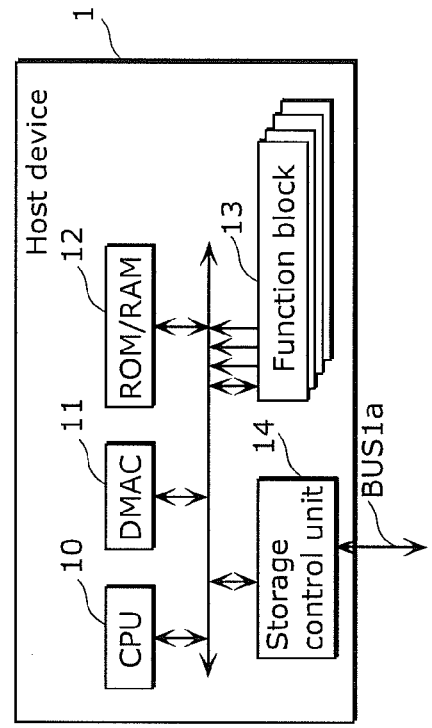
FIG. 2A is a block diagram showing a structure of a host device according to Embodiment 1.

According to an exemplary embodiment disclosed herein, a storage control device that controls two or more storage devices, the storage control device including: an area control unit configured to determine one or more valid areas for each type of areas included in respective storage areas stored in the two or more storage devices to generate a virtual storage having, as a storage area, a set of the one or more valid areas; an attribute control unit configured to select, as speed information of the virtual storage, a lowest value of minimum guaranteed speeds in reading and writing which are included among respective pieces of attribute information stored in the two or more storage devices, with reference to the respective pieces of the attribute information; and an access control unit configured to transmit information regarding the storage area of the virtual storage and the speed information to a host device that reads and writes data from/to the virtual storage.

The above structure can provide the virtual storage by using the respective storage areas stored in the two or more storage devices. It is also possible to access the virtual storage without controlling the two or more storage devices individually. Furthermore, real-time access to the virtual storage is also possible, which means that a large-amount storage easily accessible in real time can be provided.

It is also possible that the attribute control unit is further configured to select, as the speed information, a largest value of transfer units in reading and writing which are included among the respective pieces of the attribute information, with reference to the respective pieces of the attribute information.

With the above structure, it is possible to read and write data from/to the respective storage areas stored in the two or more storage devices and to read the pieces of attribute information.

It is further possible that the attribute control unit is further configured to select, as the speed information, a largest value of speed guarantee unit sizes among the respective pieces of the attribute information, with reference to the respective pieces of the attribute information.

It is still further possible that the area control unit is configured to generate the storage area of the virtual storage to comply with a specification or standard with which each of the two or more storage devices complies, and the attribute control unit is configured to generate attribute information of the virtual storage to comply with the specification or the standard.

The above structure makes the real-time access to the virtual storage more reliable.

It is still further possible that the area control unit is configured, when a logical address for managing the storage area of the virtual storage is to be allocated to a corresponding address in the respective storage areas stored in the two or more storage devices, (i) to provide each of the respective storage areas with an overlapping area having a size equal to a unit in reading and writing (R/W unit) of the virtual storage, and (ii) to always allocate, to the two or more storage devices by the R/W unit, each of (ii-a) reading data from the virtual storage to the host device and (ii-b) writing data from the host device to the virtual storage.

With the above structure, the host device can deal with, for example, the virtual storage generated from the two or more storage devices as a storage compliant with a known specification or standard.

It is still further possible that the storage control device further includes an initialization control unit configured to initialize the two or more storage devices to make it possible to (i) read and write data from/to the respective storage areas stored in the two or more storage devices and (ii) to read the respective pieces of the attribute information from the two or more storage devices.

The above structure can provide the virtual storage by using the respective storage areas stored in the two or more storage devices.

It is still further possible that the area control unit is configured, when each of logical addresses for managing the storage area of the virtual storage is to be allocated to a corresponding address in the respective storage areas stored in the two or more storage devices, to perform the allocation to cause logical addresses among the logical addresses to be consecutive for an area having a same type in a corresponding one of the respective storage areas stored in the two or more storage devices.

With the above structure, it is possible to transfer pieces of data from the host device sequentially to the two or more storage devices in parallel by units in reading and writing (R/W unit (RWU)), thereby improving performance of accessing from host device to the virtual storage.

It is still further possible that the area control unit is configured, when each of consecutive logical addresses for managing the storage area of the virtual storage is to be allocated to a corresponding address in the respective storage areas stored in the two or more storage devices, to allocate, by a unit in reading and writing (R/W unit) of the virtual storage, the consecutive logical addresses sequentially to different storage devices among the two or more storage devices.

With the above structure, it is possible to allocate accesses to respective corresponding storage devices by the R/W unit, even if the host device reads or writes data from/to the virtual storage by accessing the plurality of storage devices. In other words, the host device can access without recognizing the storage devices individually.

It is still further possible that the area control unit is further configured to generate an address conversion table in which each of logical addresses of the storage area of the virtual storage is allocated to a corresponding one of logical addresses of the respective storage areas stored in the two or more storage devices, and the storage control device further includes a management information storing unit configured to store the address conversion table generated by the area control unit.

With the above structure, it is possible to access the virtual storage without controlling the two or more storage devices individually.

It is still further possible that the access control unit is configured to transmit information regarding the storage area of the virtual storage and the speed information to the host device in response to a command transmitted from the host device.

With the above structure, information necessary for access from the host device to the virtual storage can be transmitted to the host device at an appropriate time.

These general and specific aspects may be implemented to a system, a method, an integrated circuit, a computer program, or a computer-readable recording medium such as a Compact Disc Read Only Memory (CD-ROM), or any desired combination of them.

Hereinafter, exemplary embodiments are described in detail with reference to the accompanying Drawings. However, unnecessary details are sometimes omitted. For example, detailed explanation of well-known matters and repetitive description of substantially the same structures are avoided in some cases. This prevents the following description from being unnecessarily long, so as to facilitate understanding of those skilled in the art.

It should be noted that the inventors provide the accompanying Drawings and the following description to allow those skilled in the art to fully understand the present disclosure, and do not intend to limit the scope of the Claims by the provision of the Drawings and the description.

Embodiment 1

1-1. Configuration of Storage System

Figure 1:
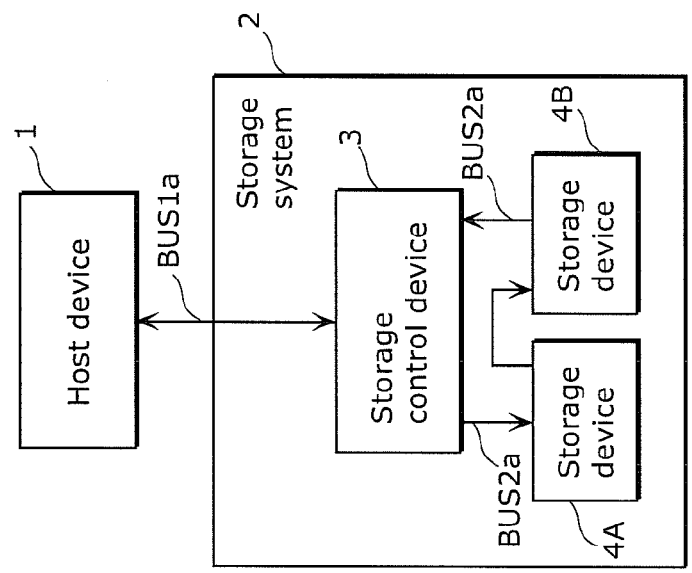
FIG. 1 is a block diagram showing a configuration of a storage system according to Embodiment 1.

FIG. 1 is a block diagram showing a configuration of a storage system according to Embodiment 1.

As shown in FIG. 1, the storage system 2 includes a storage control device 3 and a plurality of storage devices 4A and 4B. The storage system 2 is connected to a host device 1. It should be noted that FIG. 1 does not show elements except the constituent elements described in Embodiment 1. It should also be noted that, hereinafter, a storage device 4 represents the storage devices 4A and 4B when describing the same constituent elements and the same processing between them.

As shown in FIG. 1, the storage control device 3 and the host device 1 are connected to each other via a BUS 1a to exchange commands, responses, data, and the like. The storage control device 3 are connected to the storage devices 4A and 4B via a BUS 2a to exchange commands, responses, data, and the like with the storage devices 4A and 4B. The BUS 1a and the BUS 2a are physically different signal lines but have the same specifications. In Embodiment 1, it is assumed that the storage control device 3 and the storage devices 4A and 4B are connected by ring connection. Therefore, the provision of the single BUS 2a allows the storage control device 3 to be connected to the plurality of the storage devices 4A and 4B.

Figure 2C:
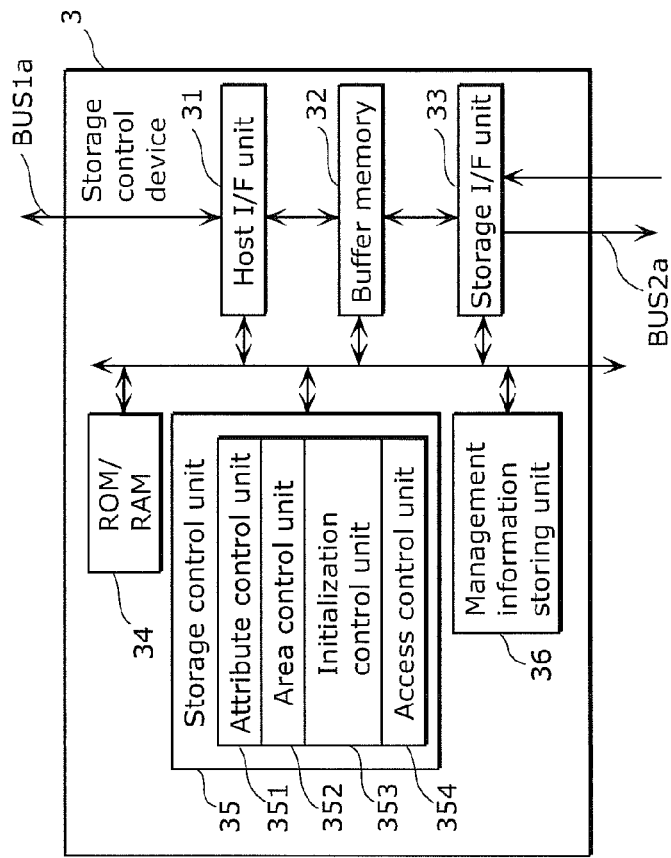
FIG. 2C is a block diagram showing a structure of a storage control device according to Embodiment 1.
Figure 2B:
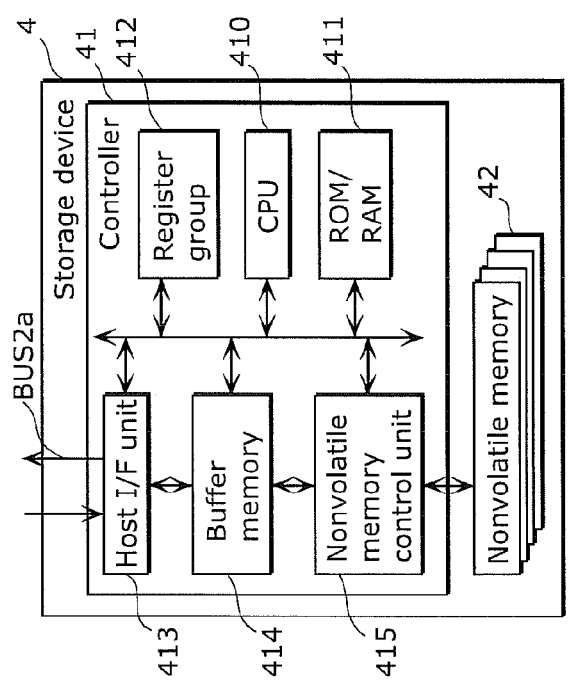
FIG. 2B is a block diagram showing a structure of a storage device according to Embodiment 1.

FIG. 2A is a block diagram showing the structure of the host device 1 connected to the storage system 2 according to Embodiment 1. FIG. 2B is a block diagram showing the structure of the storage device 4 included in the storage system 2. FIG. 2C is a block diagram showing the structure of the storage control device 3 included in the storage system 2.

[1-1-1. Structure of Host Device]

As shown in FIG. 2A, the host device 1 includes a Central Processing Unit (CPU) 10, a Direct Memory Access Controller (DMAC) 11, a Read-Only Memory/Random Access Memory (ROM/RAM) 12, various function blocks 13, and a host-side storage control unit 14.

The CPU 10 controls the entire host device 1. The DMAC 11 is a DMA controller that transfers data between the ROM/RAM 12, the function blocks 13, and the host-side storage control unit 14. The ROM/RAM 12 is a memory storing instructions to be executed by the CPU and data to be used by the CPU. The provision of the function blocks 13 depends on functions of the host device 1. For example, the function blocks 13 are a network interface, display control, a codec for moving pictures and still pictures, a user interface such as a keyboard and a touch panel, and the like.

The host-side storage control unit 14 accesses the storage system 2 according to instructions from the CPU 10 so as to transmit a command to the storage system 2, receive a response, and exchange data with the storage system 2 via the BUS 1a. The "access" refers to communication control between the host-side storage control unit 14 and the storage system 2, such as initialization of the storage system 2, register information reading, and data reading and writing (hereinafter, referred to also as reading/writing). Examples of the host device are a personal computer (PC), a digital camera, a Smartphone, a vehicle navigation device, and the like.

[1-1-2. Structure of Storage Device]

As shown in FIG. 2B, the storage device 4 includes a controller 41 and nonvolatile memories 42.

As shown in FIG. 2B, the controller 41 includes a CPU 410, a ROM/RAM 411, a register group 412, a host I/F unit 413, a buffer memory 414, and a nonvolatile memory control unit 415.

The host I/F unit 413 is connected to the storage control device 3 and other storage device(s) 4 to receive commands, transmit responses, and exchange data. It should be noted in the present embodiment that, as the storage control device 3 serves as a host device of the storage device 4, the host device 1 and the storage control device 3 are not distinguished from each other but referred to simply as "host devices" in the following description regarding the structure of the storage device 4.

The buffer memory 414 is a memory that temporarily stores data to be written by the host device to the nonvolatile memory 42 and data read by the host device from the nonvolatile memory 42. Although it is common to use a volatile static RAM as the buffer memory 414, recently a nonvolatile memory such as a Magnetoresistive Random Access Memory (MRAM) has been widely used. The nonvolatile memory control unit 415 transfers data between the nonvolatile memories 42 and the buffer memory 414.

The register group 412 is a group of registers storing pieces of attribute information and pieces of control information regarding the storage device 4. FIG. 3A is a diagram showing an example of pieces of attribute information stored in the register group 412 in the storage device 4 according to Embodiment 1.

As shown in FIG. 3A, the pieces of the attribute information are: a vendor ID; a product name; product information such as a serial number; a block length; information regarding data transfer between the storage device and the host device, such as units of transferring data in reading/writing (R/W unit (RWU)); a normal area size (user data area size); information regarding a storage area of a nonvolatile memory, such as a protected area size; information regarding reading/writing performance, such as speed guarantee performance and a speed guarantee unit size; and the like.

Here, the R/W unit is a value indicating how many blocks to be transferred in a unit when reading/writing. The storage device 4 according to the present embodiment transfers data, by R/W unit, in reading/writing between the storage device 4 and the host device regardless of a start address. Only if a transfer size instructed by the host device is smaller than the R/W unit or if last transfer in reading/writing is smaller than the R/W unit, the storage device 4 transfers data of a size smaller than the R/W unit. For example, if the R/W unit is four blocks, ten blocks are divided into three groups of four blocks, four blocks, and two blocks to be transferred.

Those pieces of attribute information are stored in one or more registers, and read according to a command issued by the host device in initializing the storage device 4. The host device determines, based on the readout attribute information, whether or not the storage device 4 complies with a certain specification or standard, and thereby accesses the storage device 4. Examples of the specification or standard are a Secure Digital (SD) memory card, Multi-Media Card (MMC), a Compact Flash®, and the like.

The pieces of control information are: the number of the nonvolatile memories 42; a capacity of the nonvolatile memories 42; an address conversion table used to convert or allocate a logical address instructed by the host device for reading/writing into/to an address of the nonvolatile memory 42; and the like. Those pieces of control information are used by the CPU 410 to process a read/write command issued from the host device to the storage device 4.

The ROM/RAM 411 is a memory storing instructions to be executed by the CPU 410 and data to be used by the CPU 410. Based on a command received from the host device, the CPU 410 controls a part or all of the register group 412, the host I/F unit 413, the buffer memory 414, and the nonvolatile memory control unit 415, so as to exchange data and register information with the host device.

The above-described structure of the storage device 4 allows the host device to control the storage device 4 based on a certain specification or standard regardless of type or generation of the nonvolatile memories 42 and thereby perform data reading and writing on the storage device 4.

Each of the nonvolatile memories 42 is a storage medium storing data to be read or written by the host device. Examples of the nonvolatile memory 42 are a NAND flash memory, a MRAM, a Phase-Change Memory (PCM), a Resistance Random Access Memory (ReRAM), and the like.

Figure 3B:
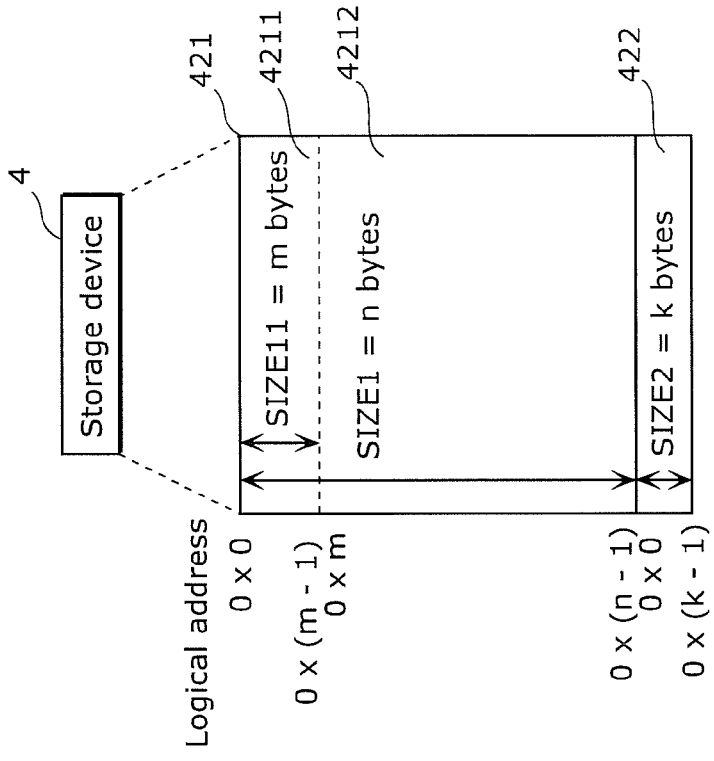
FIG. 3B is a diagram showing a structure of a storage area in a nonvolatile memory in the storage device according to Embodiment 1.
Figure 3A:
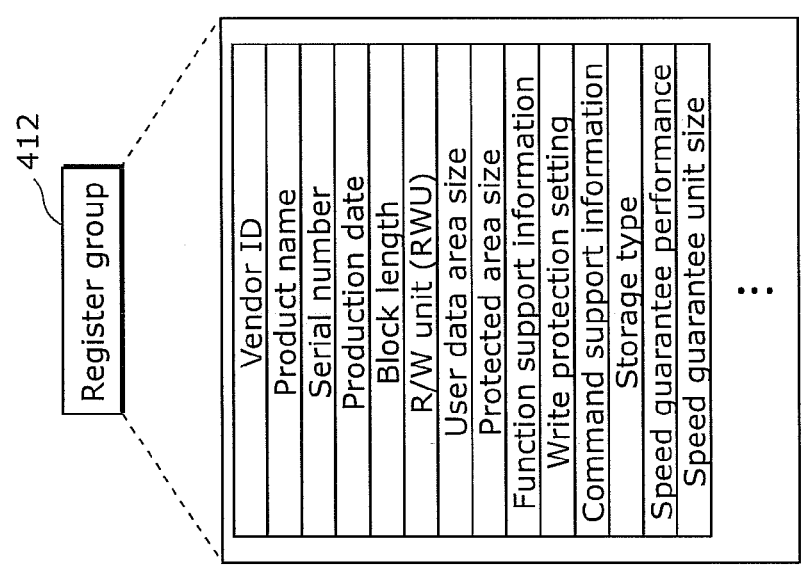
FIG. 3A is a diagram showing an example of pieces of attribute information stored in a register group in the storage device according to Embodiment 1.

FIG. 3B is a diagram showing a structure of a storage area generated by the controller 41 by using a storage medium of the nonvolatile memory 42. Here, the storage area refers to an area which the host device designates by a logical address to read or write data.

Shown in FIG. 3B, the controller 41 generates a storage area of the storage device 4 to have a normal area 421 and a protected area 422. The host device manages the normal area 421 and the protected area 422 by respective logical addresses for instructing data reading or writing. The controller 41 converts such a logical address instructed by the host device to a physical address of the nonvolatile memory 42 with reference to the address conversion table in the register group 412, and thereby reads and writes data. Although various methods are disclosed for such address conversion, the address conversion in the present embodiment is not limited to any specific method but may be any desired method.

It should be noted that the normal area and the protected area which are included in the storage area of the storage device 4 are examples of areas having respective different types in the storage area.

Furthermore, the normal area 421 is divided into a file system management area 4211 and a user data area 4212 to be managed by the controller 41. The file system management area 4211 is an area in which pieces of file system management information are stored. A size of the file system management area 4211, "SIZE11=m bytes", is determined based on a size of the normal area 421, "SIZE1=n bytes", and a type of a used file system.

If the used file system is defined according to the specification or standard with which the storage device 4 complies, the size of the file system management area 4211 is uniquely determined. The previously-described speed guarantee performance is information indicating performance of reading and writing data from/to the file system management area 4211 and reading and writing data from/to the user data area 4212. The guarantee performance and the performance measurement conditions vary depending on the respective areas. The speed guarantee unit size is the performance measurement conditions for reading and writing data from/to the user data area 4212. Performance measured in continuously reading or writing data of this size is stored as attribute information.

[1-1-3. Structure of Storage Control Device]

The storage control device 3 is a device that controls two or more storage devices. As shown in FIG. 2C, the storage control device 3 includes a host I/F unit 31, a buffer memory 32, a storage I/F unit 33, a ROM/RAM 34, a storage control unit 35, and a management information storing unit 36.

The host I/F unit 31 is connected to the host device 1 via the BUS 1a to receive commands, transmit responses, and exchange data. The storage I/F unit 33 is connected to the storage device 4 via the BUS 2a to receive commands, transmit responses, and exchange data. The buffer memory 32 is connected to the host I/F unit 31 and to the storage I/F unit 33 and temporarily stores data to be exchanged between the host device 1 and the storage device 4. The ROM/RAM 34 is a memory storing instructions to be executed by the storage control unit 35 and data to be used by the storage control unit 35.

The management information storing unit 36 stores: register information read from the plurality of storage devices 4 connected to each other via the BUS 2a; and management information for causing the host device 1 to treat the plurality of storage devices 4 as a single virtual storage.

As shown in FIG. 2C, the storage control unit 35 further includes an attribute control unit 351, an area control unit 352, an initialization control unit 353, and an access control unit 354. The storage control unit 35 performs control to cause the host device 1 to treat the plurality of storage devices 4 as a single virtual storage, and control data exchange between the host device 1 and the storage devices 4 based on a command received from the host device 1.

The attribute control unit 351 generates pieces of attribute information of the virtual storage with reference to pieces of attribute information included in each of the registers read from the storage devices 4, and stores the generated pieces of attribute information into the management information storing unit 36. More specifically, the attribute control unit 351 selects, as a minimum guaranteed speed of the virtual storage, the lowest value of respective reading/writing minimum guaranteed speeds (speed guarantee performance) included in the pieces of attribute information.

Furthermore, the attribute control unit 351 selects, as a transfer unit in reading/writing from/to the virtual storage, the largest value of respective reading/writing transfer units included in the pieces of attribute information.

In addition, the attribute control unit 351 selects, as a speed guarantee unit size of the virtual storage, the largest value of the speed guarantee unit sizes included in the respective pieces of attribute information.

It should be noted that the minimum guaranteed speed, the reading/writing transfer unit, and the speed guarantee unit size in the present embodiment are examples of speed information.

The area control unit 352 determines a valid area from each of area types in the storage area stored in each of the storage devices 4, thereby generating a virtual storage having, as a storage area, a set of such determined valid areas. Then, the area control unit 352 generates an address conversion table for allocating a logical address used by the host device 1 to read or write data from/to the virtual storage with a logical address of one of the storage devices 4, and stores the generated address conversion table into the management information storing unit 36.

The initialization control unit 353 initializes the storage devices 4. The initializing refers to processing for allowing state transition for each of the storage devices 4 so that data can be read or written from/to a storage area in the storage device 4.

The access control unit 354 refers to the attribute information of the virtual storage and the address conversion table which are stored in the management information storing unit 36, according to a command received from the host device 1 via the host I/F unit 31. Furthermore, the access control unit 354 controls the host I/F unit 31, the buffer memory 32, and the storage I/F unit 33 to control data exchange between the host device 1 and the storage devices 4. In addition, the access control unit 354 transmits, to the host device 1, the attribute information of the virtual storage (information regarding the storage areas of the virtual storage and the speed information) stored in the management information storing unit 36, according to a command received from the host device 1.

The above-described structure of the storage control device 3 can generate the virtual storage from/to which the host device 1 can read and write data, with reference to the pieces of attribute information and the storage areas of the plurality of storage devices 4.

1-2. Processing of Storage System

The following description is given for processing performed by the storage system 2 shown in FIG. 1 having the above-described configuration. The storage system 2 performs initialization, generation of a virtual storage, and processing for accesses from the host device 1. The following described each processing.

[1-2-1. Initialization]

Figure 4A:
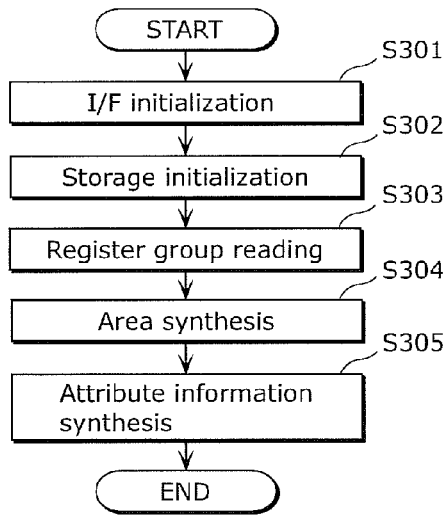
FIG. 4A is a flowchart showing how the storage control device initializes the storage devices according to Embodiment 1.

FIG. 4A is a flowchart of how the storage control device 3 initializes the storage devices 4A and 4B in the storage system 2.

As shown in FIG. 4A, the storage control unit 35 in the storage control device 3 first performs I/F initialization (S301). The I/F initialization is for activating the BUS 2a connecting the storage control device 3 to the storage devices 4A and 4B to enable exchange of commands, responses, and data. The I/F initialization includes clock frequency setting and bit/symbol synchronization. In the present embodiment, the storage control device 3 and the storage devices 4A and 4B are ring-connected together via the BUS 2a. Therefore, when the storage control device 3 completes the I/F initialization, all the BUS 2a connected to the storage control device 3 and the storage devices 4A and 4B are initialized, and exchange of commands, responses, and data become possible among them.

Next, the initialization control unit 353 in the storage control device 3 performs storage initialization (S302). The storage initialization is processing performed on the storage devices 4A and 4B to make the register groups 412 and the normal areas 421 in the storage devices 4A and 4B accessible. To execute the storage initialization, the storage control device 3 transmits a command to the storage devices 4A and 4B to instruct reset or initialization processing.

Next, the attribute control unit 351 in the storage control device 3 performs register group reading (S303). The register group reading is processing for reading pieces of attribute information and pieces of control information from the respective register groups 412 in the storage devices 4A and 4B.

Next, the area control unit 352 in the storage control device 3 performs area synthesis (S304). The area synthesis is processing for generating a normal area and a protected area for the virtual storage with reference to pieces of information regarding storage areas of the nonvolatile memories, such as normal area sizes and protected area sizes, among the pieces of attribute information included in the register groups read from the storage devices 4A and 4B, and for storing area management information to the management information storing unit 36.

Next, the attribute control unit 351 in the storage control device 3 performs attribute information synthesis (S305). The attribute information synthesis is processing for generating pieces of attribute information of the virtual storage based on (a) the pieces of attribute information read from the storage devices 4A and 4B and (b) the area management information of the virtual storage generated by the above-described area synthesis, and for storing the generated pieces of attribute information into the management information storing unit 36.

When, as described above, the storage control device 3 completes the initialization to initialize the storage devices 4A and 4B and generate and store the area management information and the attribute management information of the virtual storage, the storage system 2 becomes capable of exchanging commands, responses, and data with the host device 1.

Figure 4B:
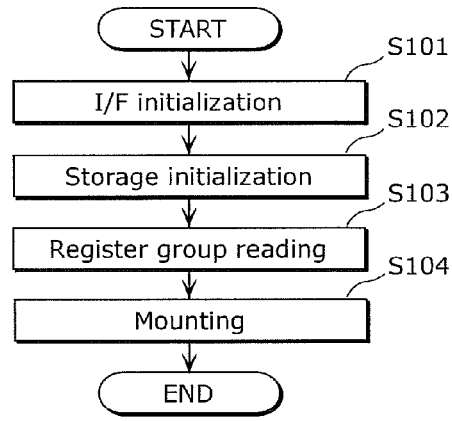
FIG. 4B is a flowchart showing how the host device initializes the storage system according to Embodiment 1.

FIG. 4B is a flowchart showing how the host device 1 initializes the storage system 2.

In FIG. 4B, the host device 1 sequentially performs I/F initialization (S101), storage initialization (S102), register group reading (S103), and then performs mounting (S104) by reading data from the storage area of the virtual storage generated in the storage system 2.

Here, the I/F initialization (S103), the storage initialization (S102), and the register group reading (S103) are the same as the I/F initialization (S301), the storage initialization (S302), and the register group reading (S303), respectively, which are performed by the storage control device 3 as previously described with reference to FIG. 4A. In FIG. 4B, however, these steps are performed on the storage system 2 by the host device 1. In other words, the host device 1 performs the same initialization as that in the case where the storage device 4 is connected directly to the host device 1, so that the host device 1 can read and write data from/to the virtual storage generated in the storage system 2.

Figure 4C:
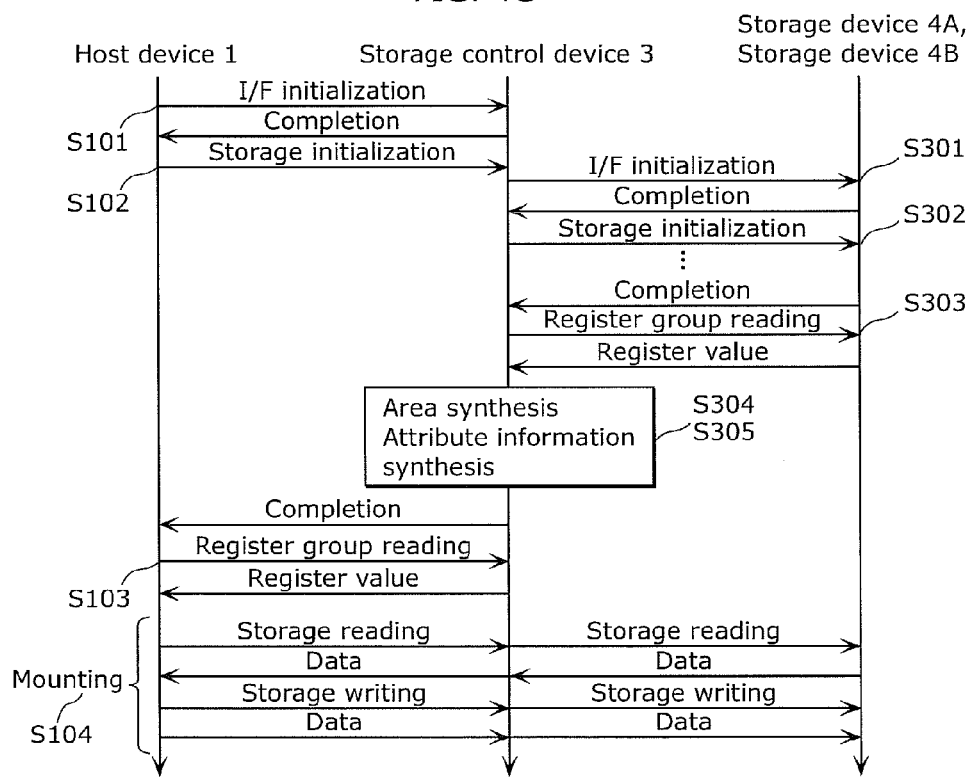
FIG. 4C is a sequence diagram showing how the host device initializes the storage system and the storage control device initializes the storage devices in the storage system, according to Embodiment 1.

FIG. 4C is a sequence diagram showing how the host device 1 initializes the storage system 2 and the storage control device 3 initializes the storage devices 4A and 4B in the storage system 2. In FIG. 4C, after the host device 1 performs the I/F initialization (S101) and the storage initialization (S102), the storage control device 3 initializes the storage devices 4A and 4B (S301 to S305), and then notifies the host device 1 of the completion of the storage initialization (S102). After that, the host device 1 performs the register group reading (S103) and the mounting (S104), thereby completing the initialization of the storage system 2.

It should be noted that the initialization of the storage devices 4A and 4B which is performed by the storage control device 3 may start without waiting for the I/F initialization (S101) and the storage initialization (S102) which are performed by the host device 1. In this case, the storage control device 3 can facilitate completion of the initialization of the storage devices 4A and 4B, and thereby the host device 1 can reduce a time required for the initialization of the storage system 2.

1-3. Structure of Virtual Storage

Figures 5A, 5B:
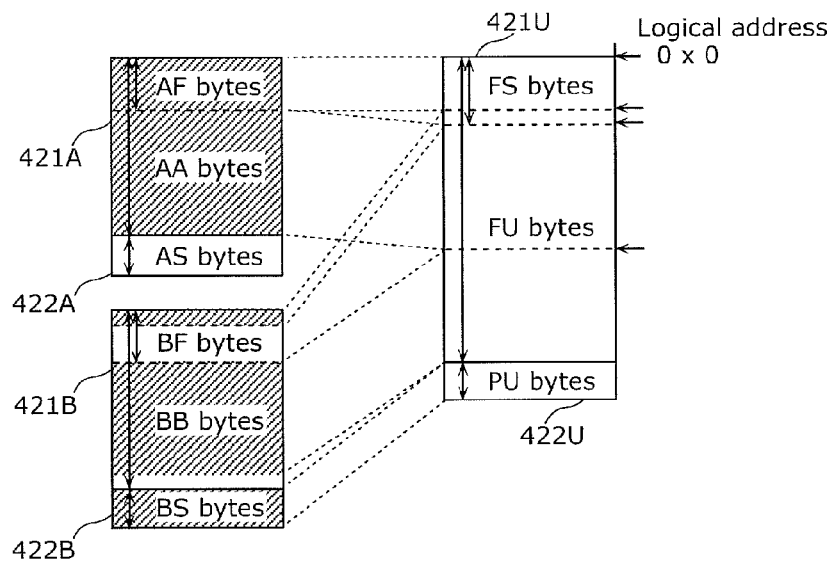
FIG. 5A is a schematic diagram showing how the storage control device controls generation of a virtual storage by using a plurality of storage devices, according to Embodiment 1.
FIG. 5B is an example of an address conversion table stored in the storage control device according to Embodiment 1.

FIG. 5A is a schematic diagram showing how the storage control device 3 controls generation of the virtual storage by using the storage devices 4A and 4B according to Embodiment 1.

As shown in, for example, FIG. 5A, the area control unit 352 in the storage control device 3 generates a normal area 421U and a protected area 422U of the virtual storage, from (a) a normal area 421A and a protected area 422A of the storage device 4A and (b) a normal area 421B and a protected area 422B of the storage device 4B. The normal area 421A has a size of AA bytes, the normal area 421B has a size of BB bytes, and the normal area 421U has a size of FU bytes. Furthermore, each of beginning AF bytes of the normal area 421A, beginning BF bytes of the normal area 421B, and beginning FS bytes of the normal area 421U is a file system management area. The protected area 422A has a size of AS bytes, the protected area 422B has a size of BS bytes, and the protected area 422U has a size of PU bytes.

First, the area control unit 352 in the storage control device 3 generates the normal area 421U of the virtual storage from the normal areas 421A and 421B, so that the generated normal area 421U is suitable for the specification or standard with which each of the storage devices 4A and 4B complies. In other words, the area control unit 352 in the storage control device 3 uses, as the normal area 421U of the virtual storage, FU bytes, which are an integral multiple of a predetermined size, among a total (AA+BB) bytes of the normal areas of the storage devices 4A and 4B. Here, the "predetermined size" may be a speed guarantee unit size described later, or a fixed value such as 1 Mbytes or 512 Kbytes.

The beginning of the normal area 421U of the virtual storage is a file system management area. The size of the file system management area, FS bytes, is determined depending on the size of the normal area, FU bytes, and an used file system. It should be noted that the file system used in the storage system 2 according to the present embodiment is assumed to be defined according to the specification or standard with which each of the storage devices 4A and 4B complies, but the file system is not limited to this. For example, the host device 1 may notify the storage control device 3 of the used file system by using means such as a command.

Next, the area control unit 352 in the storage control device 3 generates the protected area 422U of the virtual storage from the protected areas 422A and 422B, so that the generated protected area 422U is suitable for the specification or standard with which each of the storage devices 4A and 4B complies. In other words, the storage control device 3 uses, as the protected area of the virtual storage, PU bytes among a total (AS+BS) bytes of the protected areas of the storage devices 4A and 4B. Here, the PU bytes are a size defined according to the specification or standard with which each of the storage devices 4A and 4B complies. The PU bytes may be defined based on the normal area size, FU bytes, or may be a fixed value regardless of the normal area size.

The storage system 2 according to the present embodiment generates the normal area (FU bytes) of the virtual storage by using the entire normal area of the storage device 4A and a part of the normal area of the storage device 4B. Furthermore, the protected area (PU bytes) of the virtual storage are generated by using the entire protected area of the storage device 4B (BS bytes) but not using the protected area of the storage device 4A. In other words, a hatched areas in FIG. 5A are used as the storage area of the virtual storage.

FIG. 5B is an example of an address conversion table stored in the storage control device 3.

The storage control device 3 stores the address conversion table shown in FIG. 5B in the management information storing unit 36. The address conversion table is used to allocate a logical address of the storage area of the virtual storage as instructed from the host device 1 to a corresponding address in the structure of the virtual storage which has been described with reference to FIG. 5A, thereby allocating an access to a corresponding address in the user data areas and the protected areas of the storage devices 4A and 4B. Therefore, without recognizing the storage devices 4A and 4B, the host device 1 can access the storage devices 4A and 4B merely by designating a logical address of the normal area or the protected area in the virtual storage.

As described above, the area control unit 352 in the storage control device 3 determines a valid area from each of area types in the storage area stored in each of two or more storage devices 4. Therefore, the virtual storage is generated to have, as a storage area, a set of such areas determined as valid.

More specifically, the area control unit 352 generates the storage area of the virtual storage, so that an access from the host device 1 to the file system management area in the normal area of the virtual storage is converted to an access to a corresponding file system management area of the storage device 4A or 4B. On the other hand, the area control unit 352 generates the storage area of the virtual storage, so that an access from the host device 1 to a user data area of the virtual storage is converted to an access to a corresponding user data area of the storage device 4A or 4B.

Therefore, even if the host device 1 reads or writes data from/to the file system management area or the user data area of the virtual storage, it is possible to keep the same minimum guaranteed speed as that in the case where the host device 1 reads or writes data from/to the file system management area or the user data area of the storage device 4A or 4B. Furthermore, without being conscious of the structures of the storage areas of the storage devices 4A and 4B, the host device 1 can read and write data from/to the virtual storage at a certain speed or higher, in other words, the host device 1 can access the virtual storage in real time.

As described above, after the normal area 421U of the virtual storage is generated to be suitable for the specification or standard with which each of the storage devices 4A and 4B complies, the storage control device 3 generates the register group 412U of the virtual storage from the register groups 412A and 412B of the storage devices 4A and 4B and stores the generated register group 412U to the management information storing unit 36.

Figure 5C:
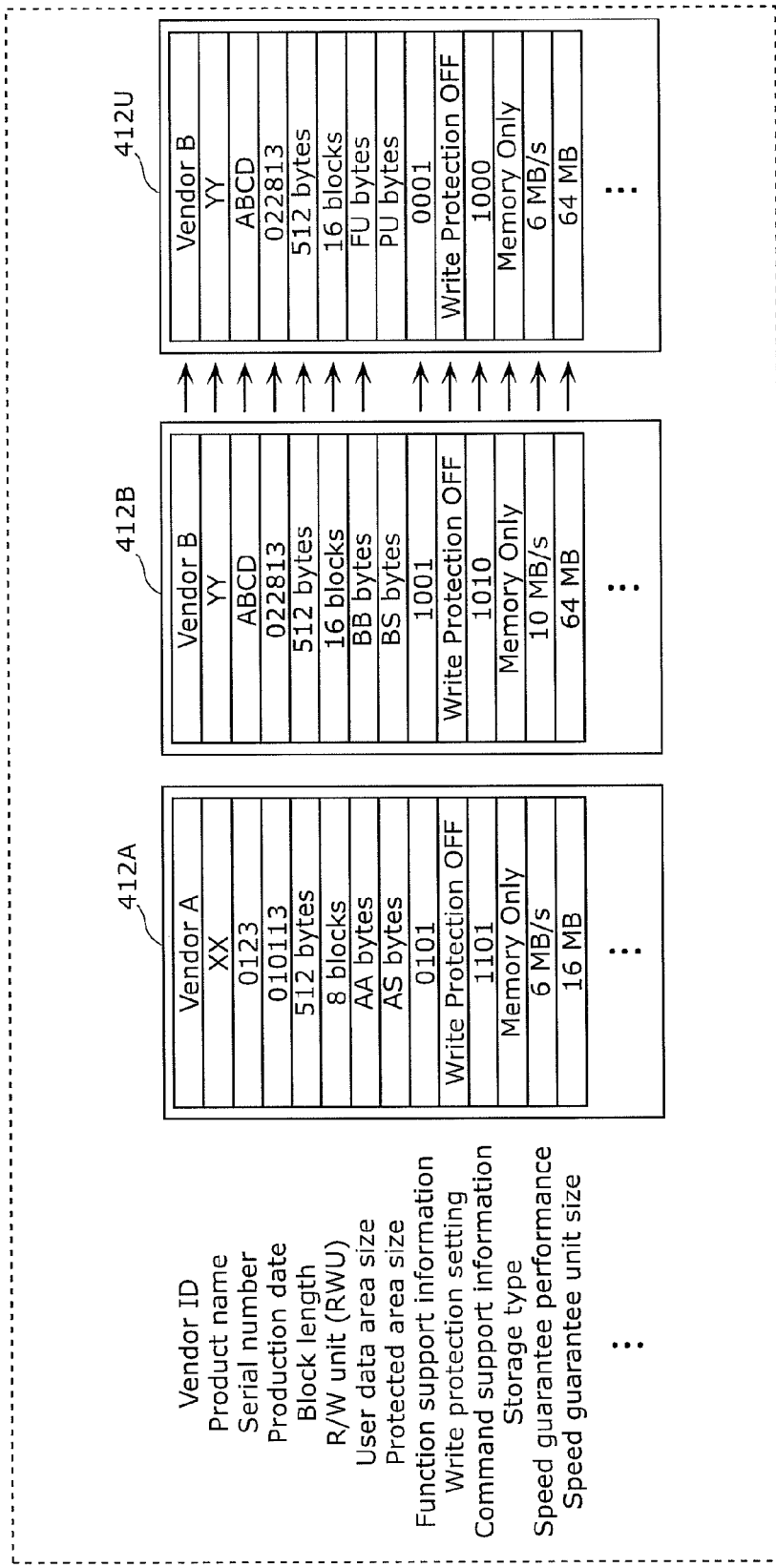
FIG. 5C is a schematic diagram showing how the storage control device controls generation of a register group for the virtual storage by using register groups of the storage devices.

FIG. 5C is a schematic diagram showing how the storage control device 3 controls generation of the register group 412U of the virtual storage from using register groups 412A and 412B of the storage devices 4A and 4B.

As shown in, for example, FIG. 5C, the attribute control unit 351 in the storage control device 3 generates each piece of attribute information of the virtual storage by using a corresponding piece of attribute information stored in the register groups 412A and 412B of the storage devices 4A and 4B. In other words, in the example shown in FIG. 5C, the pieces of product information, such as a vender ID, a product name, and a serial number, among the pieces of attribute information are the pieces of attribute information of the storage device 4B.

Each of a block length, write protection setting, and a storage type shares the same value between the storage devices 4A and 4B, so that the same value is used. Each of an R/W unit, function support information, command support information, speed guarantee performance, and a speed guarantee unit size is set to have a value that satisfies both the storage devices 4A and 4B. Since the R/W unit is to be a reading/writing transfer unit, the R/W unit is set to 16 blocks as the largest value in the respective values of the storage devices 4A and 4B.

The function support information designates a supporting function by the bit. As the supporting function, only a function supported by both the storage devices 4A and 4B is selected. In this case, the function support information indicates "0001" as a piece of attribute information of the virtual storage. The command support information designates a command by the bit. As the command, only a command supported by both the storage devices 4A and 4B is selected. In this case, the command support information indicates "1000" as a piece of attribute information of the virtual storage.

The speed guarantee performance should be guarantee performance which both the storage devices 4A and 4B satisfy. Therefore, a lower value in the values stored in the storage devices 4A and 4B is selected. In this case, the speed guarantee performance is set to 6 MB/s. The speed guarantee unit size should be a size which both the storage devices 4A and 4B satisfy. Therefore, a larger value in the values stored in the storage devices 4A and 4B is selected. In this case, the speed guarantee unit size is set to 64 MB. The normal area size and the protected area size are, as described with reference to FIG. 5A, FU bytes and PU bytes, respectively.

As described above, the storage control device 3 generates the register group 412U of the virtual storage to allow the host device 1 to read information from the register group 412U. Therefore, without recognizing the pieces of attribute information of the storage devices 4A and 4B, the host device can recognize the virtual storage as a storage compliant with the same specification or standard as that of each of the storage devices 4A and 4B.

1-4. Control of Access to Virtual Storage

[1-4-1. Register Access]

With reference to FIGS. 6A to 6G, the description is given for how the storage control device 3 controls allocation of accesses from the host device 1 to the virtual storage in the storage system 2 according to the present embodiment.

Figure 6A:
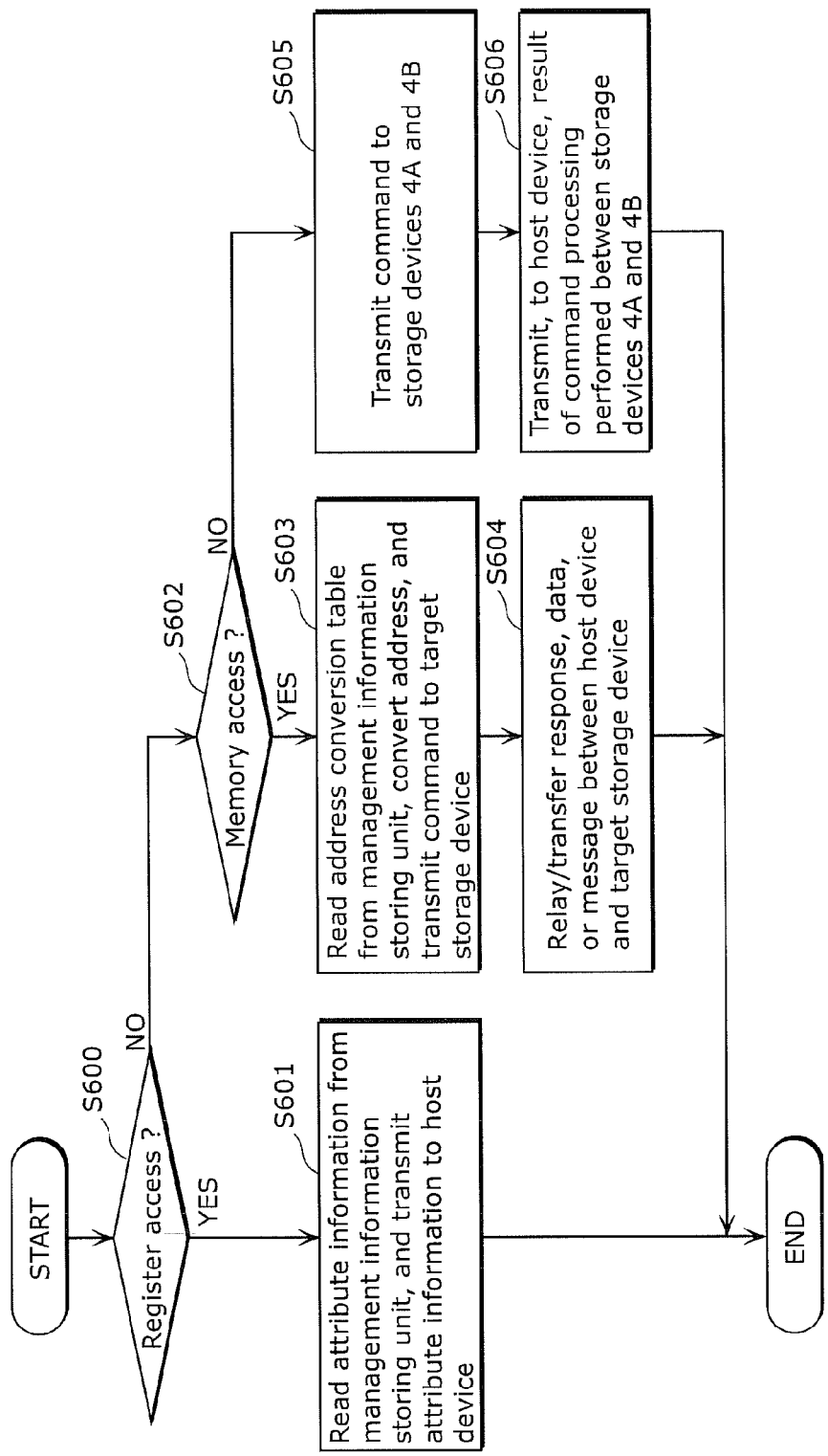
FIG. 6A is a flowchart of processing performed when the storage control device detects an access of the host device to the virtual storage, according to Embodiment 1.

FIG. 6A is a flowchart of processing performed when the storage control device 3 detects an access from the host device 1 to the virtual storage.

When an access from the host device 1 is detected, the access control unit 354 in the storage control device 3 first determines whether the access is a register access, in other words, whether the host device 1 accesses the register group (S600). The determination may be made based on, for example, a type or an argument of a command. If it is determined that the access is a register access (Yes at S600), then the access control unit 354 in the storage control device 3 reads the attribute information from the register group stored in the management information storing unit 36, and transfers the attribute information to the host device 1 (S601).

Figure 6B:
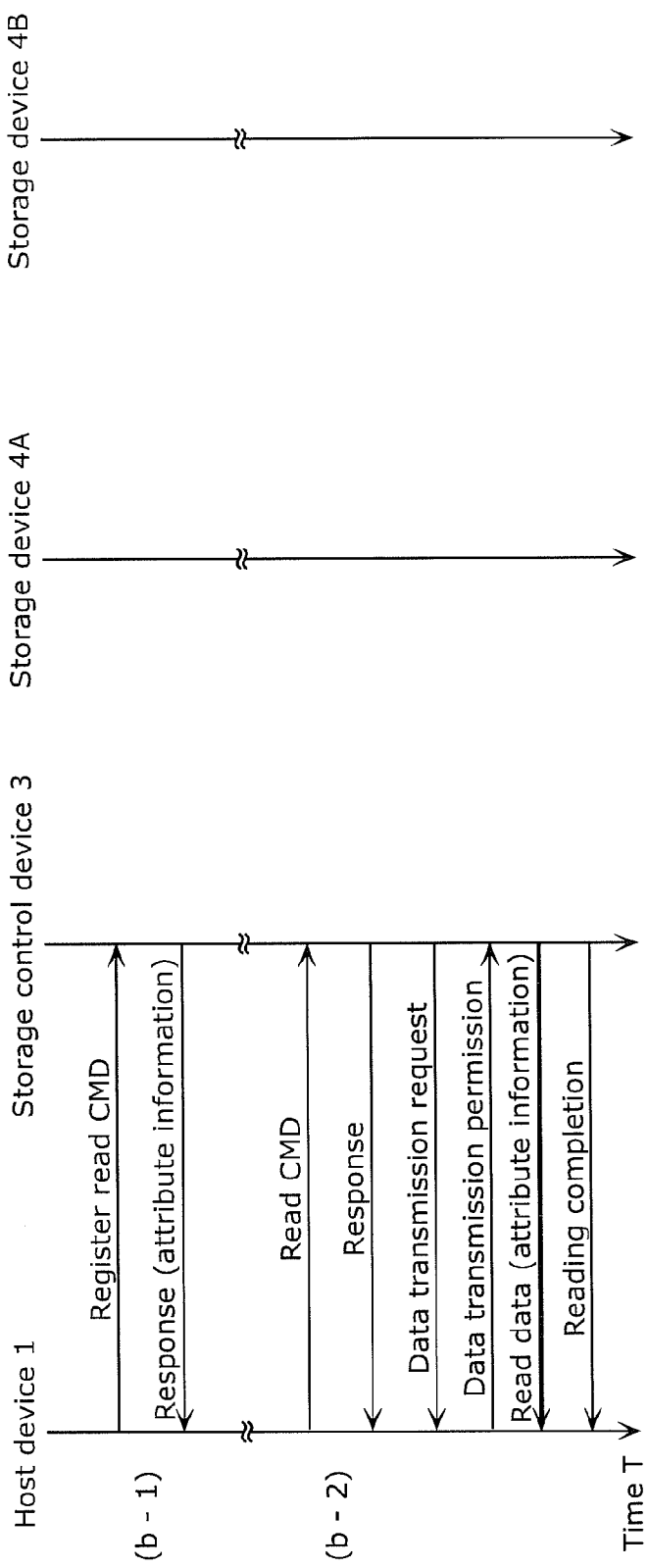
FIG. 6B is a sequence diagram of a communication flow between the host device and the storage system according to Embodiment 1.

FIG. 6B is a sequence diagram of a communication flow between the host device 1 and the storage system 2.

The storage control device 3 may add the attribute information to a response to a command, as shown in, for example, (b-1) in FIG. 6B, or transmit the attribute information as data after transmitting the response to the command, as shown in, for example, (b-2) in FIG. 6B. Here, whether to add the attribute information to a response or to transmit the attribute information as data is uniquely determined depending on the command issued by the host device 1. When the attribute information has been transmitted as data, the storage control device 3 notifies the host device 1 of the reading completion. The notification is same as the reading completion in the case of a memory access for reading which is described below.

[1-4-2. Memory Access]

Next, if an access from the host device 1 is not a register access (No at S600), then the access control unit 354 in the storage control device 3 determines whether or not the access is a memory access, in other words, whether or not the host device 1 accesses a memory (S602). The determination may be made by determining, for example, whether the command instructs writing or reading to/from the storage area of the virtual storage. If it is determined that the access is a memory access (Yes at S602), then the access control unit 354 in the storage control device 3 reads the address conversion table from the management information storing unit 36, then converts an address and a transfer size which are included in the command to an address of the storage device 4A or 4B, and transmits the command including the converted address to the target storage device (S603). Then, the access control unit 354 in the storage control device 3 relays and transfers responses, data, and messages between the host device 1 and the target storage device (S604).

[1-4-2-1. Access to Single Storage Device]

FIG. 6C is a sequence diagram of a communication flow between the host device 1 and the storage system 2 in the case where an access of the host device 1 is recognized as a memory access to either the storage device 4A or the storage device 4B.

If the storage control device 3 recognizes that the host device 1 accesses to read data from the virtual storage and that the host device 1 accesses the normal area or the protected area of the storage device 4A, then the storage control device 3 converts a logical address in the virtual storage which is included in a command (read CMD) received from the host device 1 as shown in, for example, (c-1) in FIG. 6C, into a logical address in the storage area of the storage device 4A, and then transmits the command including the converted logical address to the storage device 4A. After that, the storage control device 3 transfers a response and a data transmission request from the storage device 4A to the host device 1. Next, the storage control device 3 transfers a data transmission permission from the host device 1 to the storage device 4A. Next, the storage control device 3 transmits data read from the storage device 4A to the host device 1, and finally notifies reading completion. The reading completion is transmitted as a control message different from commands, responses, and data.

If the storage control device 3 recognizes that the host device 1 accesses to write data into the virtual storage and that the host device 1 accesses the normal area or the protected area of the storage device 4B, then the storage control device 3 converts a logical address in the virtual storage which is included in a command (write CMD) received from the host device, as shown in, for example, (c-2) in FIG. 6C, into a logical address in the storage area of the storage device 4B, and then transmits the command including the converted logical address to the storage device 4B. After that, the storage control device 3 transfers a response from the storage device 4B to the host device 1. Next, the storage control device 3 transfers a data transmission request from the host device 1 to the storage device 4B. Then, the storage control device 3 transfers a data transmission permission from the storage device 4B to the host device 1. Next, the storage control device 3 transmits writing data provided from the host device 1 to the storage device 4B, and finally notifies writing completion from the storage device 4B. The writing completion is transmitted as a control message different from commands, responses, and data. The writing completion may be the same notification as the reading completion, or different from the reading completion.

[1-4-2-2. Access to Plural Storage Devices]

Figure 6D:
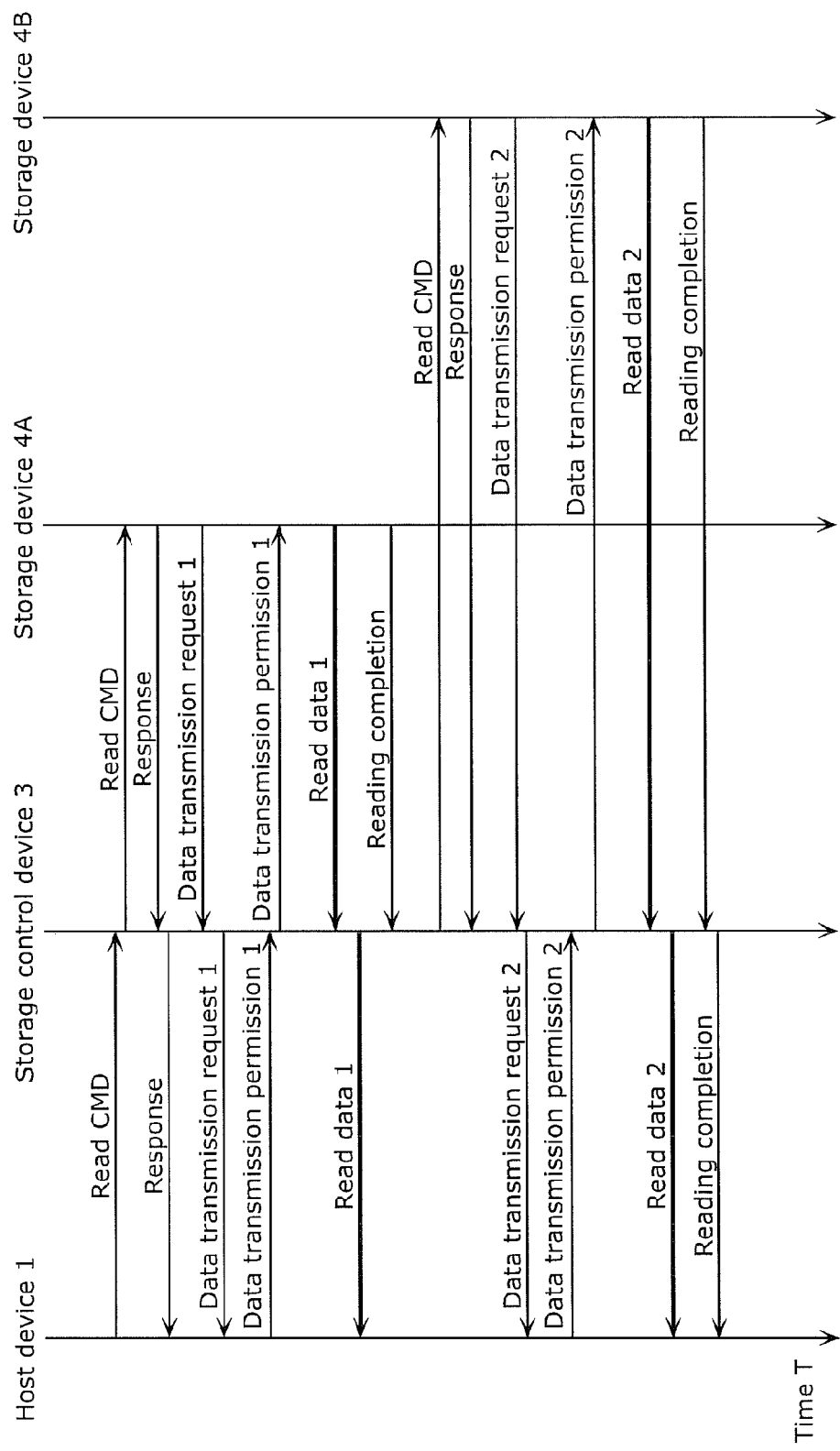
FIG. 6D is a sequence diagram of a communication flow between the host device and the storage system in the case where an access of the host device is recognized as a memory access to the storage areas of both the storage devices, according to Embodiment 1.
Figure 6E:
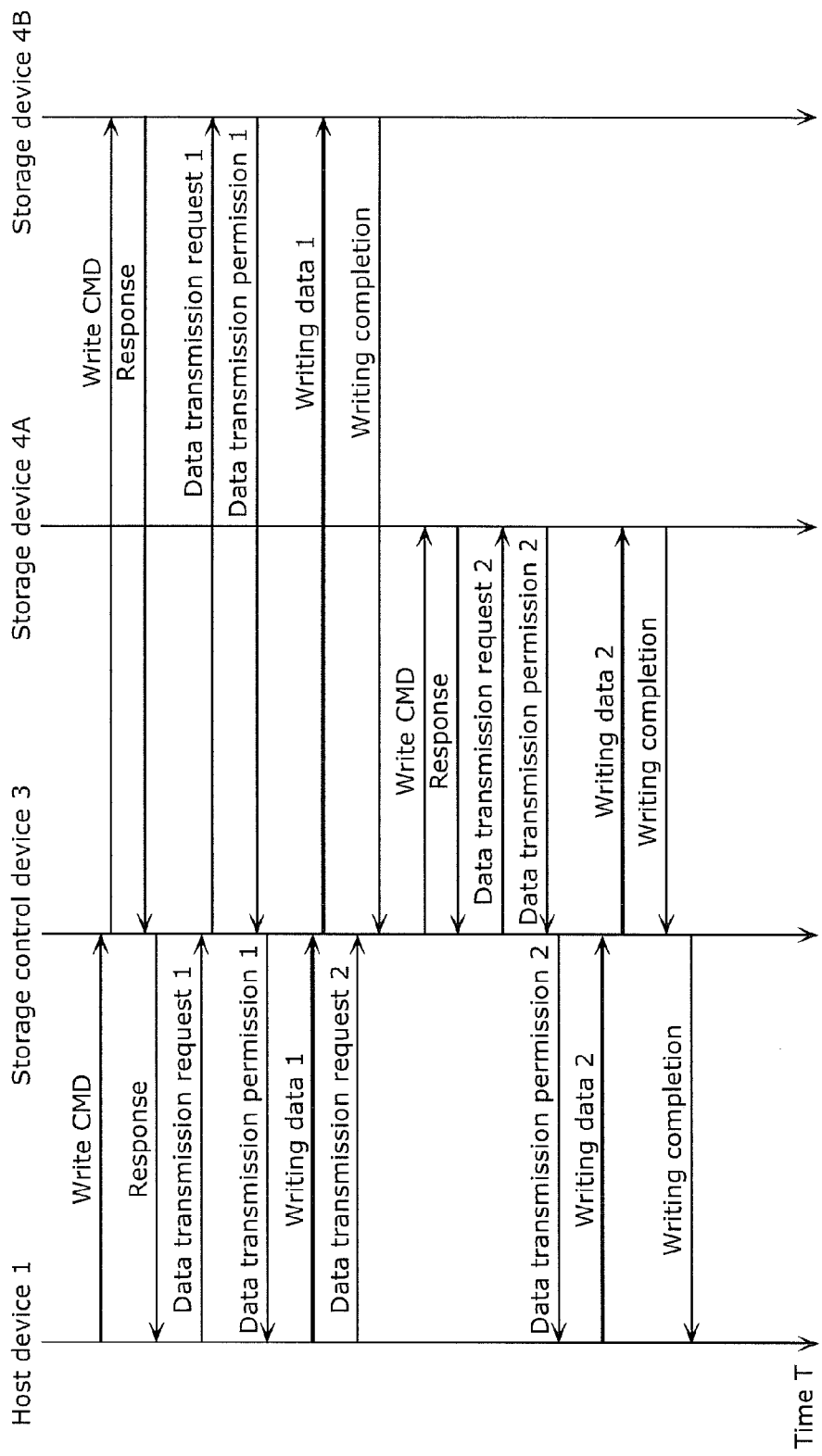
FIG. 6E is a sequence diagram of a communication flow between the host device and the storage system in the case where an access of the host device is recognized as a memory access to the storage areas of both the storage devices, according to Embodiment 1.

Each of FIGS. 6D and 6E is a sequence diagram of a communication flow between the host device 1 and the storage system 2 in the case where an access of the host device 1 is recognized as a memory access to respective storage areas of both the storage devices 4A and 4B.

If the host device 1 accesses logical addresses including "0×(FS+AA−1)" and "0×(FS+AA)" in the address conversion table shown in FIG. 5B to read data from the logical addresses, the storage control device 3 converts, as shown in FIG. 6D, each of the logical addresses of the virtual storage which are included in a command (read CMD) received from the host device 1, into a corresponding logical address of the storage device 4A from which accessing is to start, and then transmits the command including the converted logical addresses to the storage device 4A.

Here, the storage device from which accessing starts is determined based on the logical addresses included in the command received from the host device 1. Therefore, the storage device from which accessing starts may be the storage device 4B. After that, the storage control device 3 reads data up to an end of the user data area, "0×(AA−1)", of the storage device 4A. The user data area end "0×(AA−1)" corresponds to a logical address "0×(FS+AA−1)" in the virtual storage. The storage control device 3 transmits the readout data to the host device 1. The storage control device 3 further transmits a command to the storage device 4B and transfers data read from the storage device 4B to the host device 1. When reading completion is notified from the storage device 4B, the storage control device 3 notifies the host device 1 of the reading completion.

If the host device 1 accesses logical addresses including "0×(FS−1)" and "0×FS" in the address conversion table shown in FIG. 5B to write data to the logical addresses, the storage control device 3 converts, as shown in FIG. 6E, each of the logical addresses of the virtual storage which are included in a command (writing CMD) received from the host device 1, to a corresponding logical address in the storage device 4B that is a storage device from which accessing is to start, and then transmits the command including the converted logical addresses to the storage device 4B. Here, the storage device from which accessing starts is determined based on the logical addresses included in the command received from the host device 1. Therefore, the storage device from which accessing starts may be the storage device 4A. After that, the storage control device 3 writes data received from the host device 1, up to the file management area "0×(FS−AF−1)" in the storage device 4B. The file management area "0×(FS−AF−1)" corresponds to a logical address "0×(FS−1)" of the virtual storage. The storage control device 3 further transmits a command to the storage device 4A, and writes the data received from the host device 1 into the storage device 4A. It should be noted that it is seen in FIGS. 6D and 6E that the storage control device 3 performs data transfer between the host device 1 and the storage device 4A or 4B every time a data transmission request, a data transmission permission, or data is received. However, as shown in FIG. 6F, via the buffer memory 32 in the storage control device 3, the storage control device 3 may control, in parallel, the data exchange with the host device 1 and the data exchange with the storage device 4A or 4B. Even in the above case, the host device 1 can memory-accesses the virtual storage under the same control as that shown in FIGS. 6D and 6E.

[1-4-3. Accesses Other than Register Access and Memory Access]

If an access is neither a register access nor a memory access (No at S602), for example, if an access is for a reset command, the storage control device 3 transfers the received command to both the storage devices 4A and 4B (S605) and transmits, to the host device 1, results of processing the command between the storage devices 4A and 4B (S606).

Figure 6G:
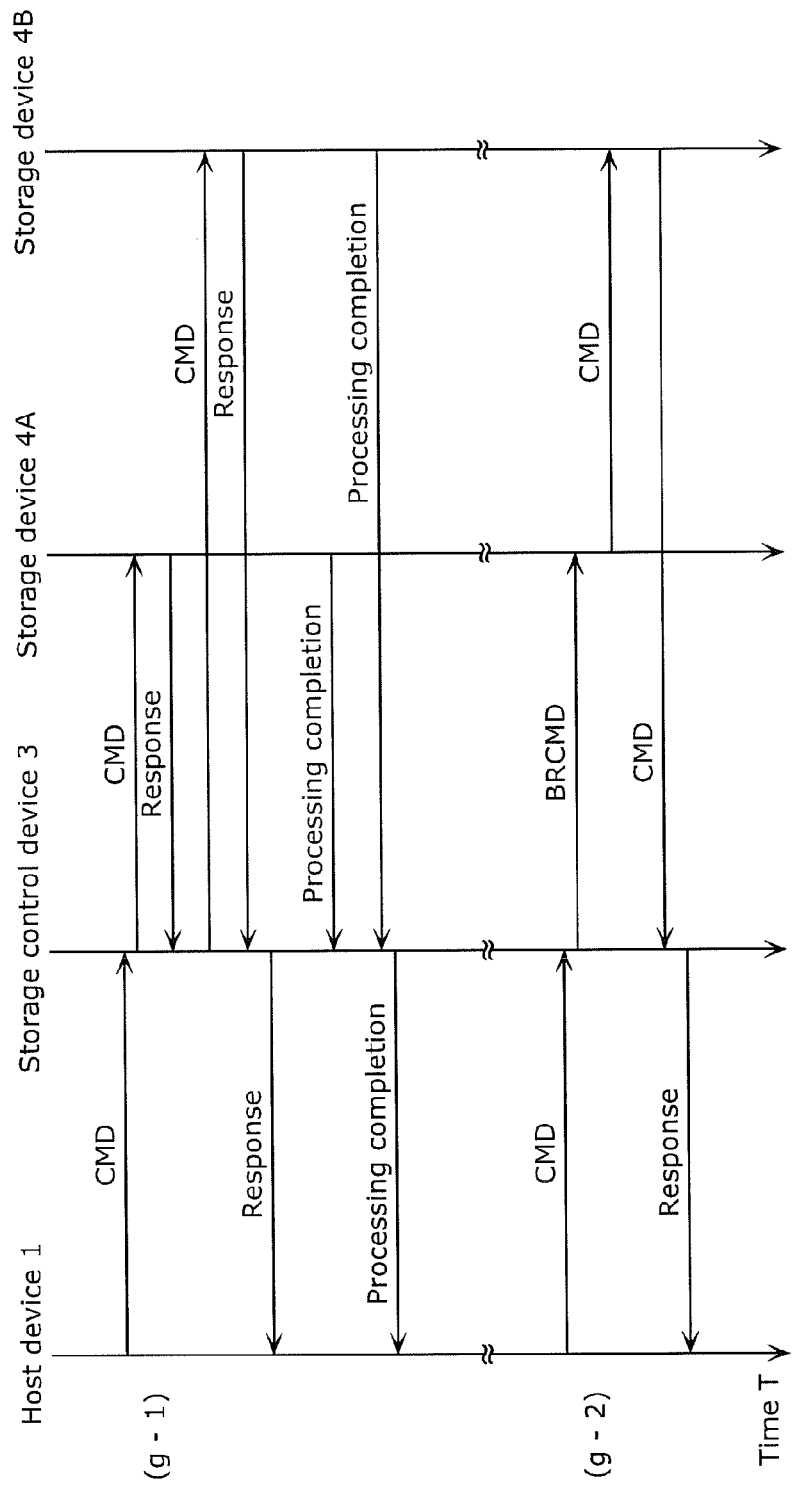
FIG. 6G is a sequence diagram of a control flow in the case where an access from the host device is neither a register-access nor a memory-access, according to Embodiment 1.

FIG. 6G is a sequence diagram of a control flow in the case where an access from the host device 1 is neither a register access nor a memory access.

When the storage control device 3 recognizes that a command received from the host device 1 is neither a register access nor a memory access, the storage control device 3 transmits the received command (CMD) to both the storage devices 4A and 4B as shown in (g-1) in FIG. 6G. After that, when responses are received from the storage devices 4A and 4B, the storage control device 3 transmits the responses to the host device 1, and when processing completion is notified from the storage devices 4A and 4B, the storage control device 3 notifies the host device 1 of the processing completion.

It should be noted that in the storage system 2 according to the present embodiment, the storage control device 3 and the storage devices 4A and 4B are ring-connected to one another. Therefore, as shown in (g-2) in FIG. 6G, the storage control device 3 may transmit, to the storage device 4A, a command received from the host device 1 as a broadcast command (BRCMD) issued to all the ring-connected storage devices. In this case, the storage device 4A processes the received command and transmits the same command to the storage device 4B, and the storage device 4B processes the received command and transmits the same command to the storage control device 3.

Here, the command transmitted by each of the storage devices 4A and 4B may be exactly the same as the received command, or may differ from the received command in that a part or all of argument or payload is updated. When the command is received, the storage control device 3 transmits a response to the host device 1 and completes the processing.

1-5. Effects and Others

As described above with reference to the figures, the storage control device 3 generates the virtual storage by using the storage areas and the register groups of the storage devices 4A and 4B, and allocates accesses from the host device 1. Therefore, without controlling the storage devices 4A and 4B individually, the host device 1 can access the virtual storage as a storage compliant with the same specification or standard as that of each of the storage devices 4A and 4B. Furthermore, the host device 1 can access the virtual storage in real time. This means that a large-amount storage easily accessible in real time can be provided.

Embodiment 2

Embodiment 2 differs from Embodiment 1 in the structure of the storage area of the virtual storage which is generated by the storage control device 3 from the storage areas of the storage devices 4A and 4B.

2-1. Structure of Virtual Storage

FIG. 7A is a schematic diagram showing how the storage control device 3 generates the storage area of the virtual storage in the storage system 2 according to Embodiment 2. FIG. 7B is an example of an address conversion table stored in the storage control device 3 according to Embodiment 2.

In the storage system 2 according to the present embodiment, when a storage area of the virtual storage is generated from the respective storage areas of the storage devices 4A and 4B, the storage control device 3 provides the storage device 4A with an overlapping area 4211U having the same size as the R/W unit of the virtual storage. In other words, as shown in (b) in FIG. 7A, the storage areas of both the storage devices 4A and 4B are allocated to logical addresses "0×(FS+AA−RWU)" to "0×(FS+AA−1)" in the virtual storage. Furthermore, as shown in FIG. 7B, in the address conversion table stored in the management information storing unit 36, logical addresses in the overlapping area 4211U are allocated to respective corresponding addresses in the storage areas of both the storage devices 4A and 4B.

For the overlapping area 4211U generated as above, the area control unit 352 in the storage control device 3 generates an overlapping area management table for managing the overlapping area, and stores the overlapping area management table to the management information storing unit 36.

Each of FIGS. 8A and 8C is an example of the overlapping area management table for managing the overlapping area. Each of FIGS. 8B and 8D is a schematic diagram showing an example of the overlapping area.

As shown in FIG. 8A, the overlapping area management table stores information indicating whether or not each offset address in the overlapping area has data. For example, in an initial state as shown in FIG. 8B, each data status is "empty".

2-2. Access to Areas Including Overlapping Area

For example, as shown in FIG. 8D, when the host device 1 is to write data into the virtual storage generated by the storage control device 3 according to the present embodiment and the host device 1 accesses areas including the overlapping area, the storage control device 3 writes, by R/W unit, pieces of data among writing data including data to be written to the overlapping area, into the storage area of the storage device 4A from "0×X" to "0×Y (=0×X+RWU−1)". Then, the storage control device 3 writes subsequent data to the storage area of the storage device 4B. Here, for Z blocks written to the overlapping area, as shown in FIG. 8C, data statuses from "0×0" to "0×(Z−1)" in the overlapping area management table are updated to "valid".

In the case where the host device 1 reads data from logical addresses including the overlapping area, if the data status is "valid" according to the overlapping area management table, the storage control device 3 reads data by R/W unit from the storage device 4A and transmits the data to the host device 1, and if the data status is "empty", the storage control device 3 reads data by R/W unit from the storage device 4B and transmits the data to the host device 1.

2-3. Effects and Others

If such an overlapping area is provided and a validity of data is managed according to the overlapping area management table, accesses can be allocated by R/W unit to corresponding addresses in the storage devices 4A and 4B even if the host device 1 reads or writes data from/to the virtual storage by accessing addresses in both the storage devices 4A and 4B. As a result, without recognizing the storage devices 4A and 4B, the host device 1 can access the storage devices 4A and 4B according to the specification or standard.

It should be noted that the arrangement of the overlapping area described in the present embodiment is an example. The same control as described above can be performed on a desired boundary between storage areas of the storage devices 4A and 4B which are allocated to logical addresses of the virtual storage.

Other Embodiments

Thus, Embodiments 1 and 2 have been described as examples of the technique disclosed in the present application. However, the technique in the present disclosure is not limited to the above embodiments, but may be applied to other embodiments generated by, for example, appropriately changing, replacing, adding, or eliminating the constituent elements in the above-described embodiments.

Figure 9A:
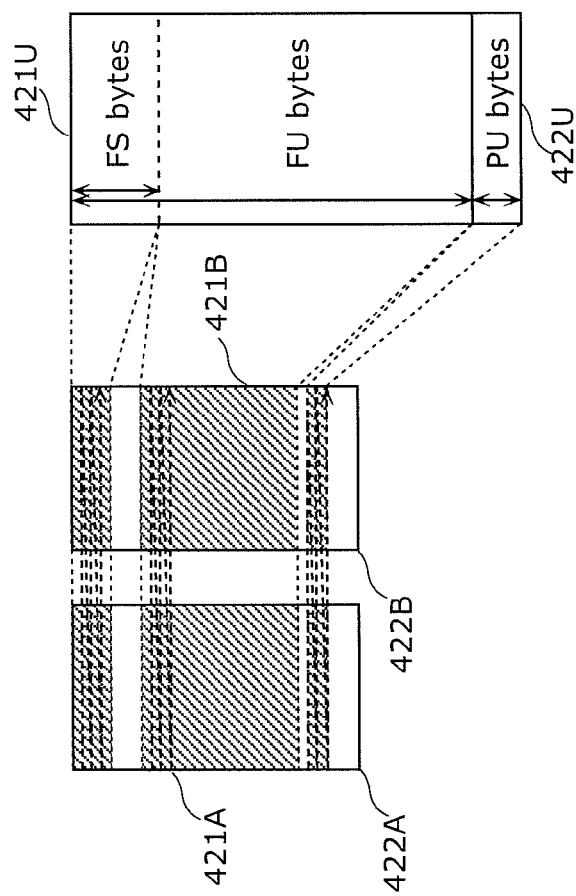
FIG. 9A is a schematic diagram showing how a storage control device generates a storage area of a virtual storage, according to another embodiment.

FIG. 9A is a schematic diagram showing how the storage control device 3 generates the storage area of the virtual storage in the storage system 2 according to another embodiment.

As shown in FIG. 9A, the storage control device 3 according to the other embodiment allocates consecutive logical addresses of the virtual storage alternately to the storage devices 4A and 4B by R/W unit of the virtual storage. In this embodiment, as shown in FIG. 9A, each of the normal area and the protected area has the same size between the storage devices 4A and 4B to be used for each of the normal area and the protected area of the virtual storage.

Figure 9B:
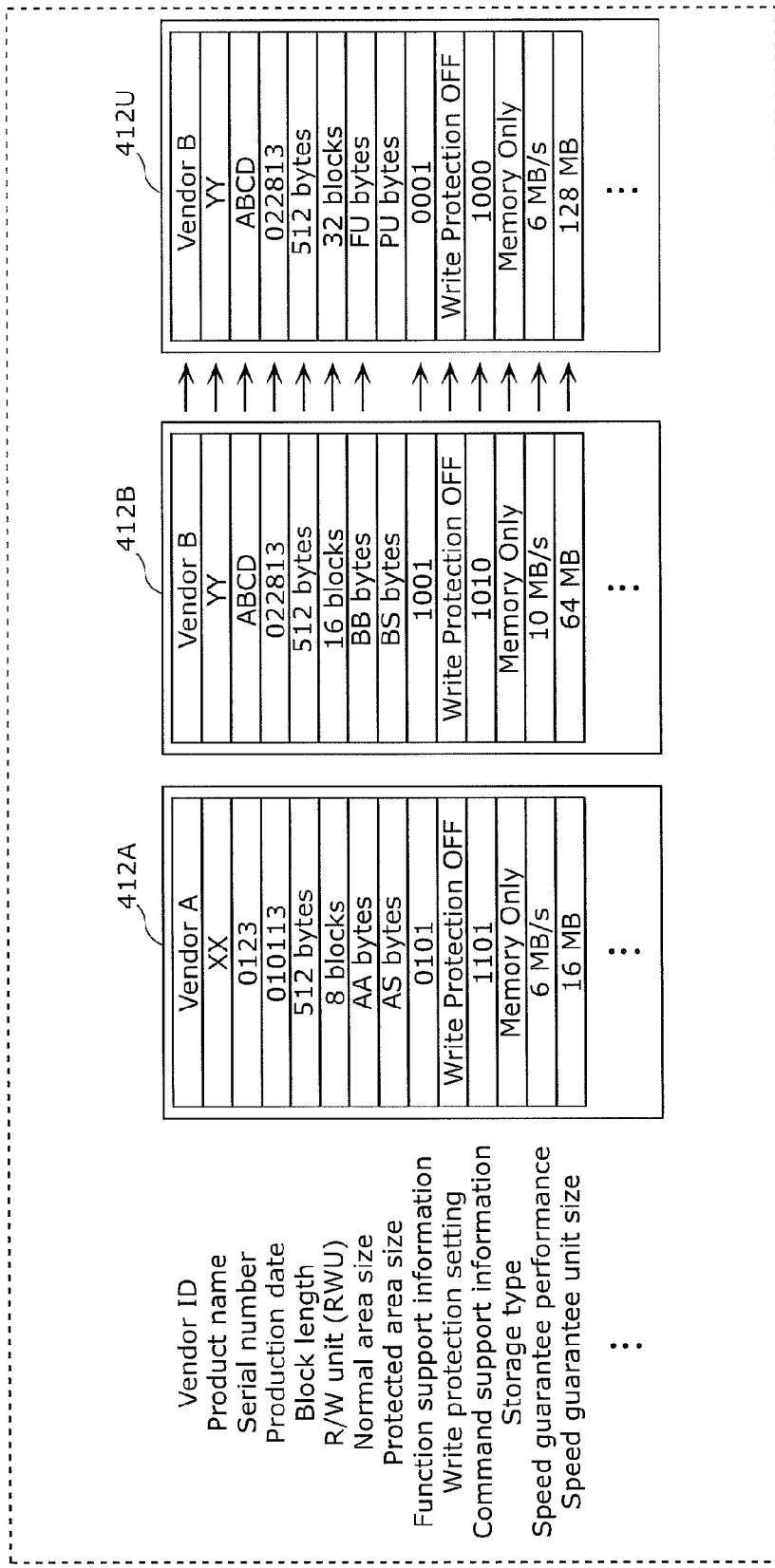
FIG. 9B is a schematic diagram showing how the storage control device controls generation of a register group of a virtual storage so as to be stored in a management information storing unit, according to the other embodiment.

FIG. 9B is a diagram showing how the storage control device 3 according to the other embodiment controls generation of the register group 412U of the virtual storage so as to be stored in the management information storing unit 36. The register group 412U of the virtual storage differs from the register groups according to Embodiments 1 and 2 in that a speed guarantee unit size is twice as large as a larger value in the respective speed guarantee unit sizes of the storage devices 4A and 4B. Furthermore, an R/W unit is also twice as large as a larger value in the respective R/W units of the storage devices 4A and 4B. The other pieces of information are the same as those in Embodiments 1 and 2.

With the above structure, it is possible to transfer pieces of data from the host device 1 alternately to the storage devices 4A and 4B in parallel by R/W unit, thereby improving the performance of accessing from the host device to the virtual storage.

Figure 10A:
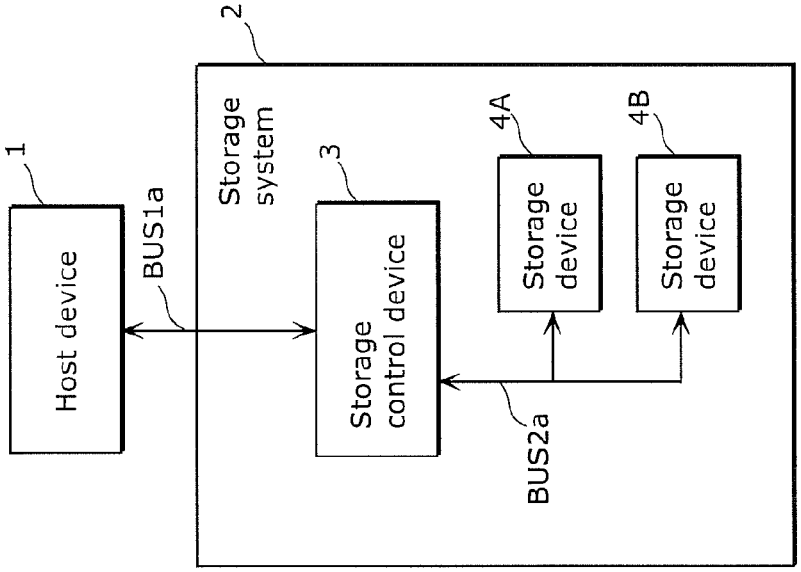
FIG. 10A is a block diagram showing a first example of a configuration of a storage system according to an other embodiment.
Figure 10B:
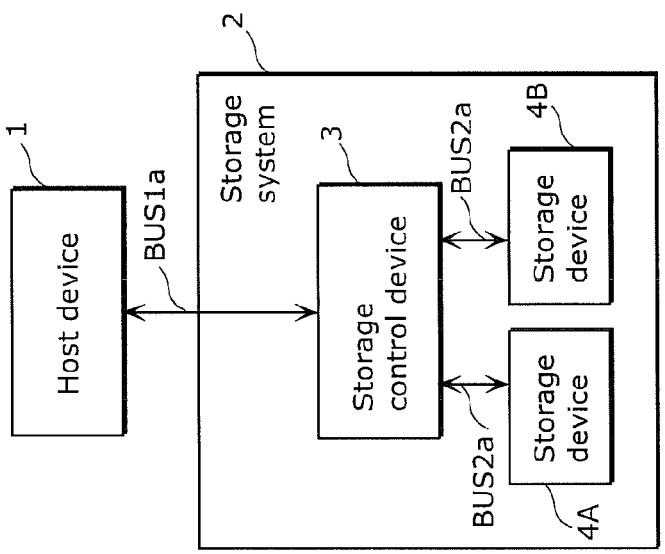
FIG. 10B is a block diagram showing a second example of a configuration of the storage system according to an other embodiment.

Each of FIGS. 10A and 10B is a block diagram showing an example of a configuration of the storage system 2 according to still another embodiment.

Depending on the specifications and the structure of the BUS 2a provided for the storage devices 4A and 4B, it is possible to connect the storage control device 3 to the storage devices 4A and 4B together via different buses as shown in FIG. 10A, or via a shared bus as shown in FIG. 10B. Such connection can also offer the same effects as described above, if the storage control device 3 generates the virtual storage as described in Embodiments 1 and 2.

It should be noted that it has been described in Embodiments 1 and 2 that the number of the storage devices 4 included in the storage system 2 is two, but the number may be three or more. Furthermore, the storage device 4 may be a removable storage or an embedded storage fixed by solder or the like. Each of the storage control devices 3 described in Embodiments 1 and 2 may be implemented to hardware, or a combination of hardware and software. However, it is desirable to implement a part of the storage control device 3 to updatable software such that the virtual storage can be generated based on updated details even if the specification or standard with which the storage device 4 complies is updated.

Thus, the embodiments have been described as examples of the technique in the present disclosure. The accompanying Drawings and the Description of Embodiments are therefore given.

Therefore, in order to provide the examples of the technique, among the constituent elements shown in the accompanying Drawings and described in the Description of Embodiments, there may be constituent elements not essential to solve the problem as well as essential constituent elements. It is therefore not reasonable to easily consider these unessential constituent elements as essential merely because the elements are shown in the accompanying Drawings or described in the Description of Embodiments.

It should also be noted that, since the above-described embodiments exemplifies the technique in the present disclosure, the constituent elements in the embodiments may be, for example, changed, replaced, added, or eliminated within a scope of the Claims or within a scope of equivalency of the Claims.

Although only some exemplary embodiments have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to storage control devices and storage systems each of which generates a virtual storage by using a plurality of storage devices. In more detail, the present disclosure can be applied to storage systems and the like, which are used for personal computers (PC), digital cameras, Smartphones, vehicle navigation, and the like.

The invention claimed is:

1. A storage control device that controls two or more storage devices, the storage control device comprising:
an area control unit configured to determine one or more valid areas for each type of areas included in respective storage areas stored in the two or more storage devices to generate a virtual storage having, as a storage area, a set of the one or more valid areas;
an attribute control unit configured to select, as speed information of the virtual storage, a lowest value of minimum guaranteed speeds in reading and writing which are included among respective pieces of attribute information stored in the two or more storage devices, with reference to the respective pieces of the attribute information; and
an access control unit configured to transmit information regarding the storage area of the virtual storage and the speed information to a host device that reads and writes data from/to the virtual storage.

2. The storage control device according to claim 1, wherein the attribute control unit is further configured to select, as the speed information, a largest value of transfer units in reading and writing which are included among the respective pieces of the attribute information, with reference to the respective pieces of the attribute information.

3. The storage control device according to claim 1, wherein the attribute control unit is further configured to select, as the speed information, a largest value of speed guarantee unit sizes among the respective pieces of the attribute information, with reference to the respective pieces of the attribute information.

4. The storage control device according to claim 1, wherein the area control unit is configured to generate the storage area of the virtual storage to comply with a specification or standard with which each of the two or more storage devices complies, and
the attribute control unit is configured to generate attribute information of the virtual storage to comply with the specification or the standard.

5. The storage control device according to claim 1, wherein the area control unit is configured, when a logical address for managing the storage area of the virtual storage is to be allocated to a corresponding address in the respective storage areas stored in the two or more storage devices, (i) to provide each of the respective storage areas with an overlapping area having a size equal to a unit in reading and writing (R/W unit) of the virtual storage, and (ii) to always allocate, to the two or more storage devices by the R/W unit, each of (ii-a) reading data from the virtual storage to the host device and (ii-b) writing data from the host device to the virtual storage.

6. The storage control device according to claim 1, further comprising
an initialization control unit configured to initialize the two or more storage devices to make it possible to (i) read and write data from/to the respective storage areas stored in the two or more storage devices and (ii) to read the respective pieces of the attribute information from the two or more storage devices.

7. The storage control device according to claim 1, wherein the area control unit is configured, when each of logical addresses for managing the storage area of the virtual storage is to be allocated to a corresponding address in the respective storage areas stored in the two or more storage devices, to perform the allocation to cause logical addresses among the logical addresses to be consecutive for an area having a same type in a corresponding one of the respective storage areas stored in the two or more storage devices.

8. The storage control device according to claim 1, wherein the area control unit is configured, when each of consecutive logical addresses for managing the storage area of the virtual storage is to be allocated to a corresponding address in the respective storage areas stored in the two or more storage devices, to allocate, by a unit in reading and writing (R/W unit) of the virtual storage, the consecutive logical addresses sequentially to different storage devices among the two or more storage devices.

9. The storage control device according to claim 1,
wherein the area control unit is further configured to generate an address conversion table in which each of logical addresses of the storage area of the virtual storage is allocated to a corresponding one of logical addresses of the respective storage areas stored in the two or more storage devices, and the storage control device further comprises a management information storing unit configured to store the address conversion table generated by the area control unit.

10. The storage control device according to claim 1,
wherein the access control unit is configured to transmit information regarding the storage area of the virtual storage and the speed information to the host device in response to a command transmitted from the host device.

11. A storage system comprising a storage control device and two or more storage devices,
wherein the storage control device includes:
an area control unit configured to determine one or more valid areas for each type of areas included in respective storage areas stored in the two or more storage devices to generate a virtual storage having, as a storage area, a set of the one or more valid areas;

an attribute control unit configured to select, as speed information of the virtual storage, a lowest value of minimum guaranteed speeds in reading and writing which are included among respective pieces of attribute information stored in the two or more storage devices, with reference to the respective pieces of the attribute information; and an access control unit configured to transmit information regarding the storage area of the virtual storage and the speed information to a host device that reads and writes data from/to the virtual storage.

12. The storage system according to claim 11,
wherein the storage control device is ring-connected to the two or more storage devices.

13. A storage control method of controlling two or more storage devices, the storage control method comprising:
determining one or more valid areas for each type of areas included in respective storage areas stored in the two or more storage devices to generate a virtual storage having, as a storage area, a set of the one or more valid areas;

selecting, as speed information of the virtual storage, a lowest value of minimum guaranteed speeds in reading and writing which are included among respective pieces of attribute information stored in the two or more storage devices, with reference to the respective pieces of the attribute information; and transmitting information regarding the storage area of the virtual storage and the speed information to a host device that reads and writes data from/to the virtual storage.

* * * * *